US011125459B2

(12) United States Patent
Fujiwara et al.

(10) Patent No.: US 11,125,459 B2
(45) Date of Patent: Sep. 21, 2021

(54) TERMINAL DEVICE, STORAGE MEDIUM AND AIR CONDITIONING SYSTEM

(71) Applicant: KABUSHIKI KAISHA TOSHIBA, Minato-ku (JP)

(72) Inventors: Kenichi Fujiwara, Kawasaki (JP); Tomoshi Otsuki, Kawasaki (JP); Miho Sako, Kawasaki (JP); Takahiro Yamamoto, Fuchu (JP); Eiichi Sunagawa, Ota (JP); Shusaku Tsuge, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 51 days.

(21) Appl. No.: 16/352,035

(22) Filed: Mar. 13, 2019

(65) Prior Publication Data

US 2020/0072487 A1 Mar. 5, 2020

(30) Foreign Application Priority Data

Sep. 3, 2018 (JP) ............................ JP2018-164612
Mar. 1, 2019 (JP) ............................ JP2019-037732

(51) Int. Cl.
*F24F 11/49* (2018.01)
*F24F 11/52* (2018.01)
(Continued)

(52) U.S. Cl.
CPC .............. *F24F 11/49* (2018.01); *F24F 11/52* (2018.01); *F24F 11/56* (2018.01); *F24F 11/65* (2018.01);
(Continued)

(58) Field of Classification Search
CPC .. F24F 11/49; F24F 11/52; F24F 11/65; F24F 11/56; F24F 2120/12; F24F 2140/00; F24F 11/63; F24F 2120/20
See application file for complete search history.

(56) References Cited

U.S. PATENT DOCUMENTS 8,555,188 B2 * 10/2013 Kim ................. H04N 21/42219 715/771
2009/0140064 A1 * 6/2009 Schultz .................... F24F 11/30 236/51

(Continued)

FOREIGN PATENT DOCUMENTS

JP 2013-130316 7/2013
JP 2015-4480 1/2015

(Continued)

OTHER PUBLICATIONS

Azbil "Cell type air conditioning system", Nexfort™, 2016, 4 pages (with English Translation).

*Primary Examiner* — Mohammad Ali
*Assistant Examiner* — Sheela Rao
(74) *Attorney, Agent, or Firm* — Oblon, McClelland, Maier & Neustadt, L.L.P.

(57) ABSTRACT

According to one embodiment, a terminal device used by a user in an indoor space in which an air conditioner is installed includes a processor. The processor is configured to input position information indicating a position of the user in the indoor space, input first bodily sensation information indicating an air conditioning state felt by the user, and output the input position information and the input first bodily sensation information to an external device.

13 Claims, 21 Drawing Sheets

(51) Int. Cl.

| | |
|---|---|
| ***F24F 11/65*** | (2018.01) |
| ***F24F 11/56*** | (2018.01) |
| *F24F 120/12* | (2018.01) |
| *F24F 140/00* | (2018.01) |

(52) U.S. Cl.

CPC ....... *F24F 2120/12* (2018.01); *F24F 2140/00* (2018.01)

(56) References Cited

U.S. PATENT DOCUMENTS

| | | | | |
|---|---|---|---|---|
| 2013/0289778 | A1* | 10/2013 | Ishizaka | G05D 23/1905 700/276 |
| 2014/0142773 | A1* | 5/2014 | Ling | G05B 13/02 700/291 |
| 2014/0374496 | A1 | 12/2014 | Miura et al. | |
| 2015/0330649 | A1 | 11/2015 | Nishii | |
| 2016/0091877 | A1* | 3/2016 | Fullam | G06T 19/006 700/276 |
| 2017/0124842 | A1* | 5/2017 | Sinha | A61B 5/02055 |
| 2019/0017720 | A1 | 1/2019 | Otsuki et al. | |
| 2019/0041883 | A1* | 2/2019 | Clark | G06F 1/3231 |

FOREIGN PATENT DOCUMENTS

| | | |
|---|---|---|
| JP | 2015-215146 | 12/2015 |
| JP | 2019-19988 | 2/2019 |

* cited by examiner

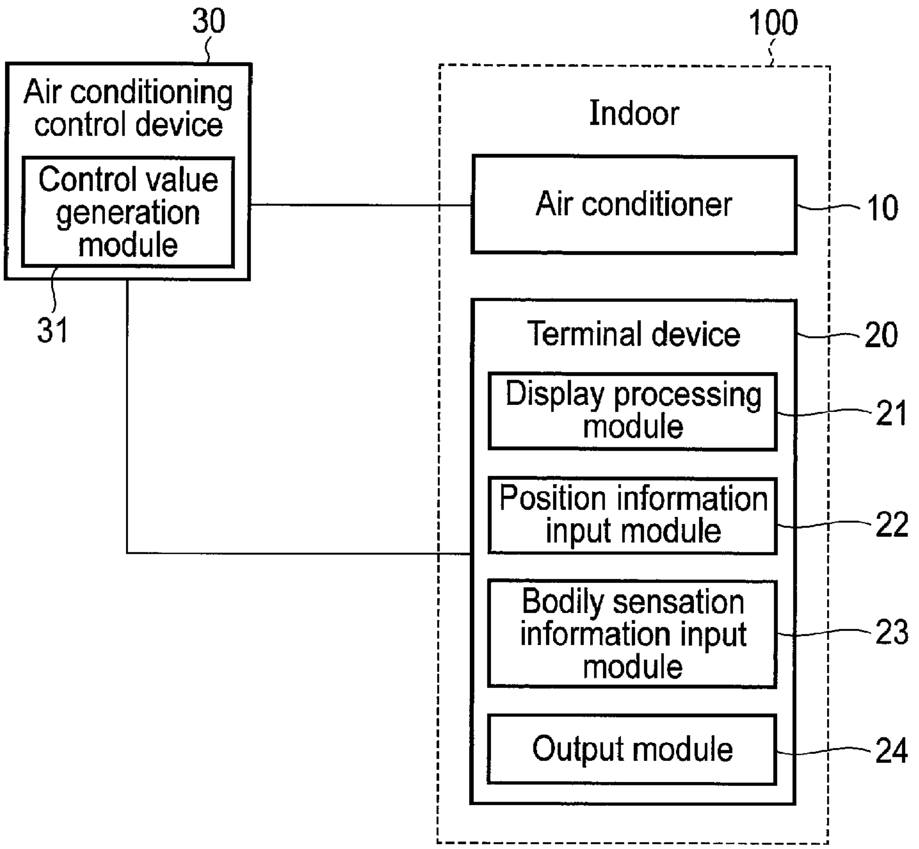
F I G. 2
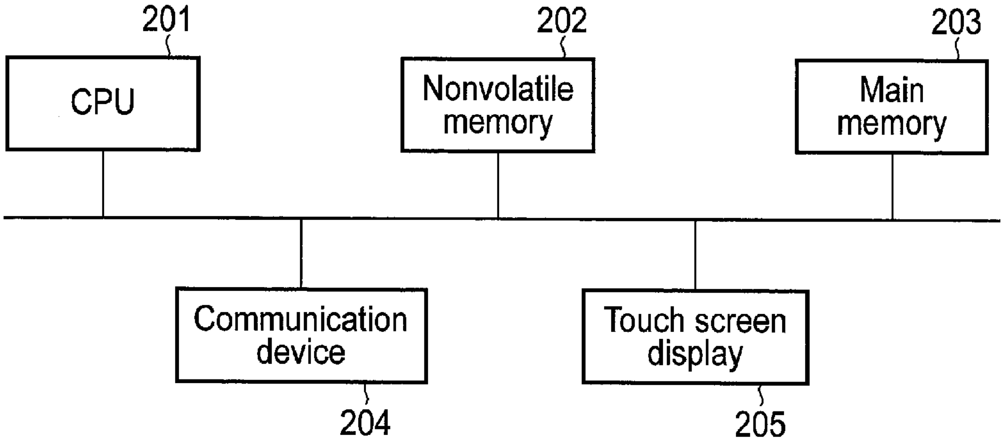
F I G. 3

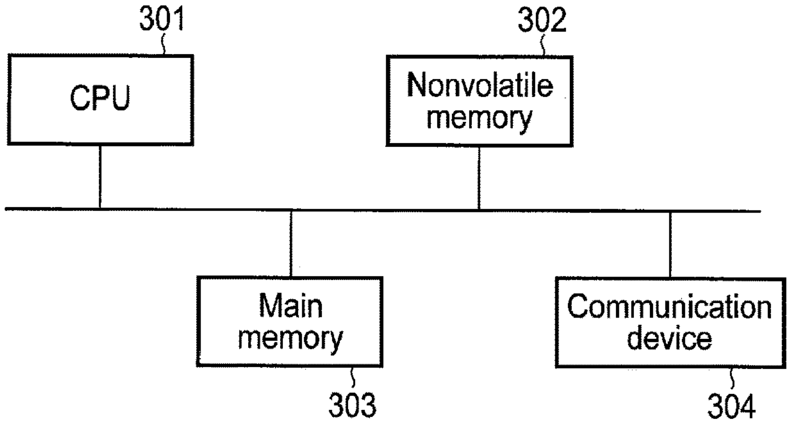
F I G. 4
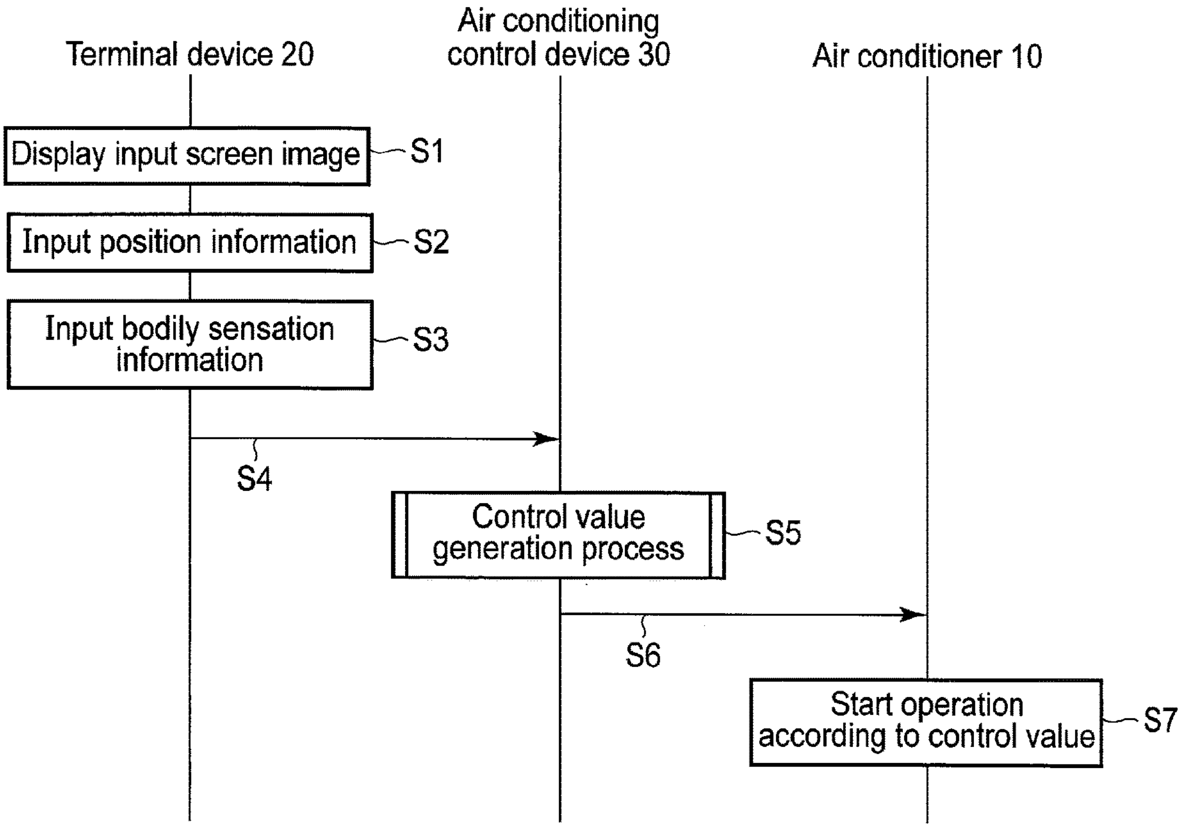
F I G. 5

| Position information | Bodily sensation information |
|---|---|
| 20, 3 | +2 |

| Air conditioner ID | Start/Stop state | Operation mode | Set temperature | Wind volume | Wind direction (east) | Wind direction (south) | Wind direction (west) | Wind direction (north) |
|---|---|---|---|---|---|---|---|---|
| 1 | No change | No change | −2°C | +1 | 1 | 0 | 0 | 1 |

FIG. 11

| Air conditioner ID | Start/Stop state | Operation mode | Set temperature | Wind volume | Wind direction (east) | Wind direction (south) | Wind direction (west) | Wind direction (north) |
|---|---|---|---|---|---|---|---|---|
| 1 | On | Cooling | No change | No change | 1 | 1 | 1 | 1 |

FIG. 12

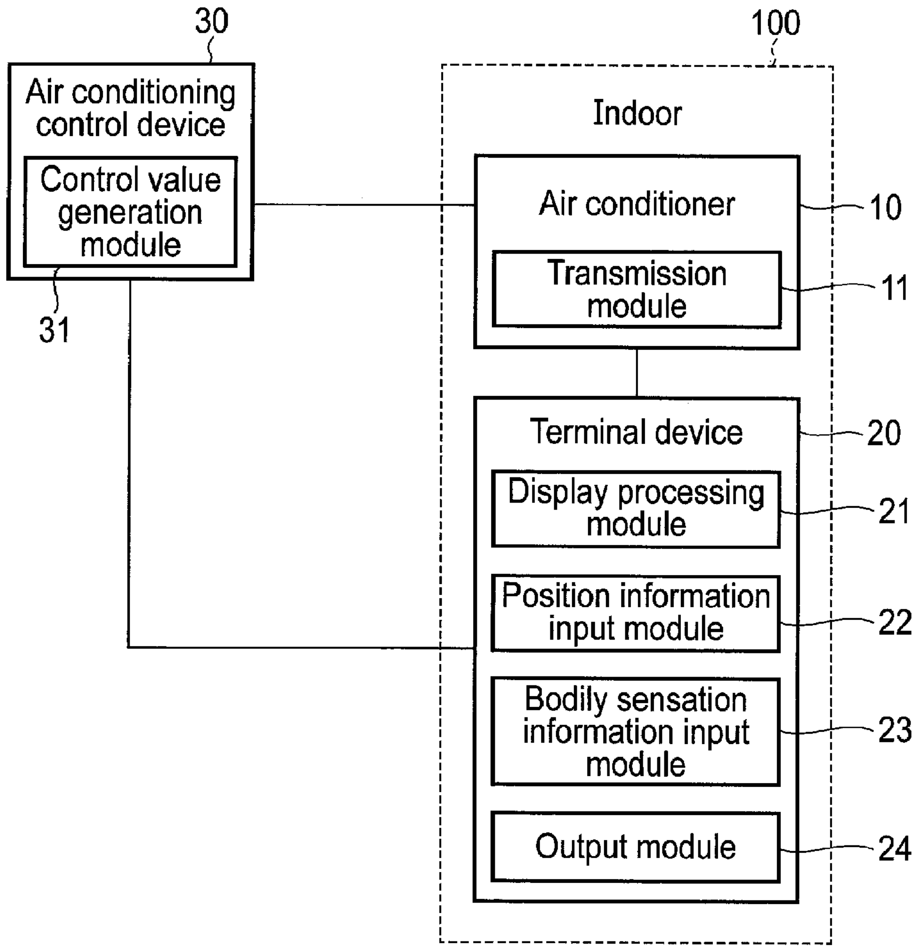
F I G. 13

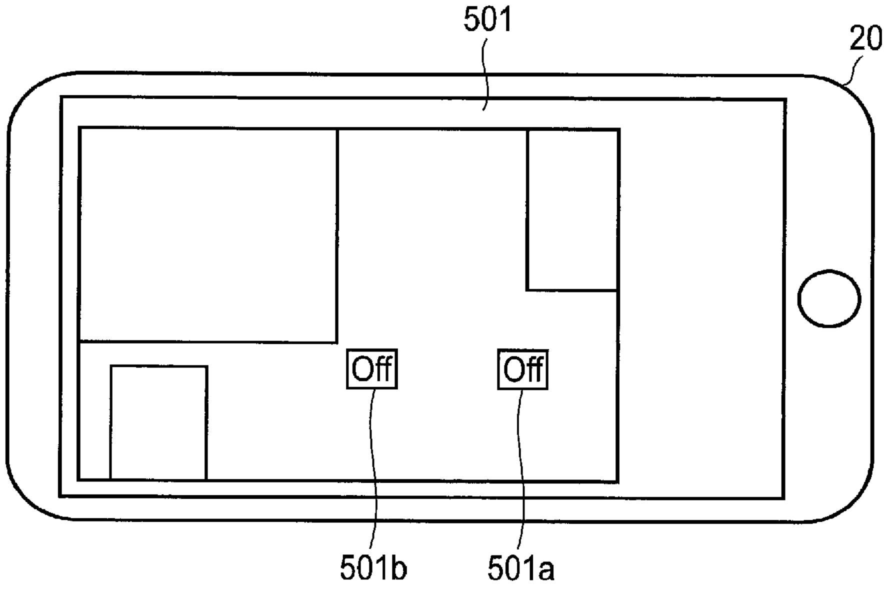
F I G. 15
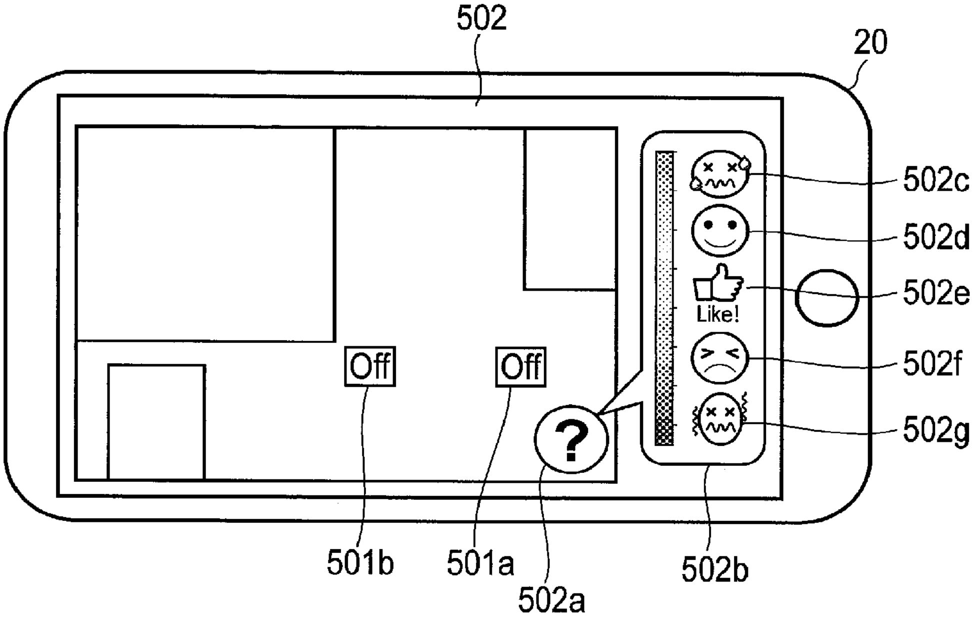
F I G. 16

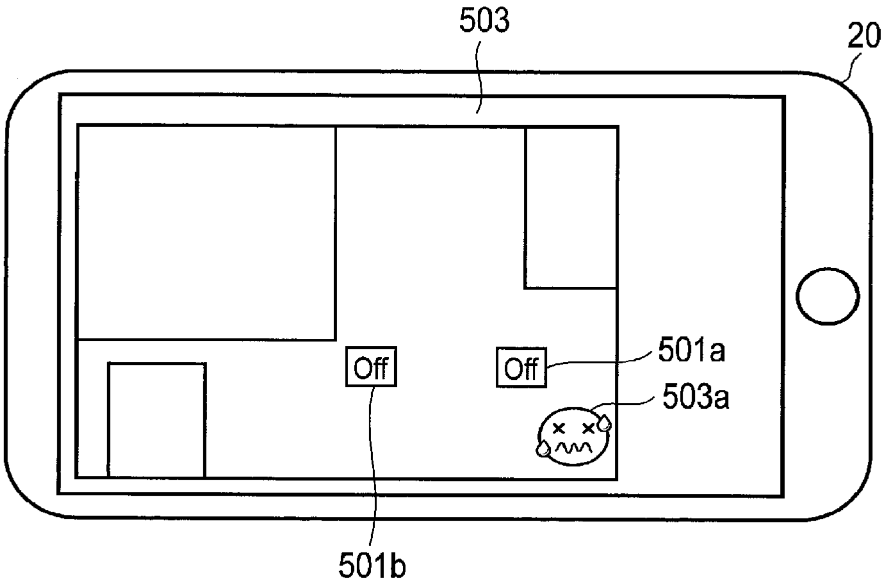
F I G. 17

| Air conditioner ID | Start/Stop state | Operation mode | Set temperature | Wind volume | Wind direction (east) | Wind direction (south) | Wind direction (west) | Wind direction (north) | Progress |
|---|---|---|---|---|---|---|---|---|---|
| 1 | On | Cooling | 24°C | Strong | 1 | 0 | 0 | 1 | In 5 minutes |

F I G. 18

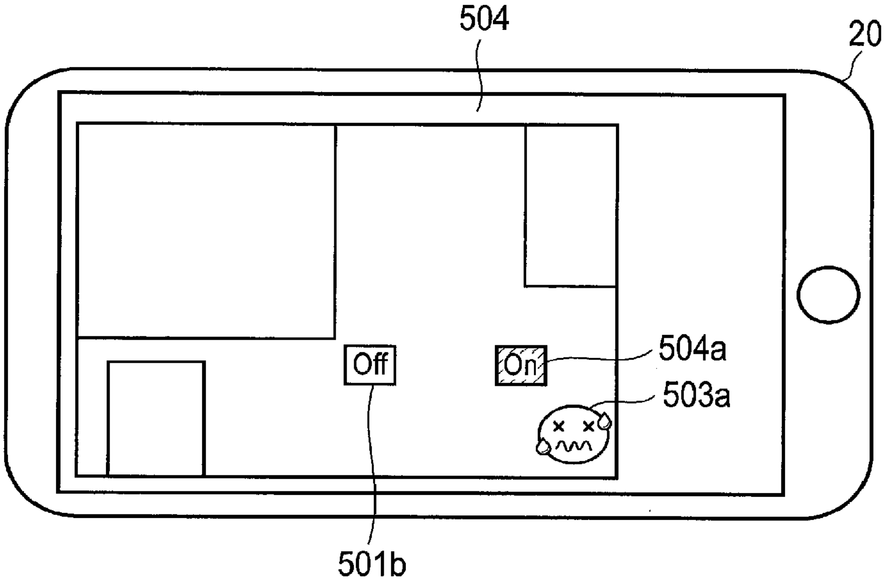
F I G. 19
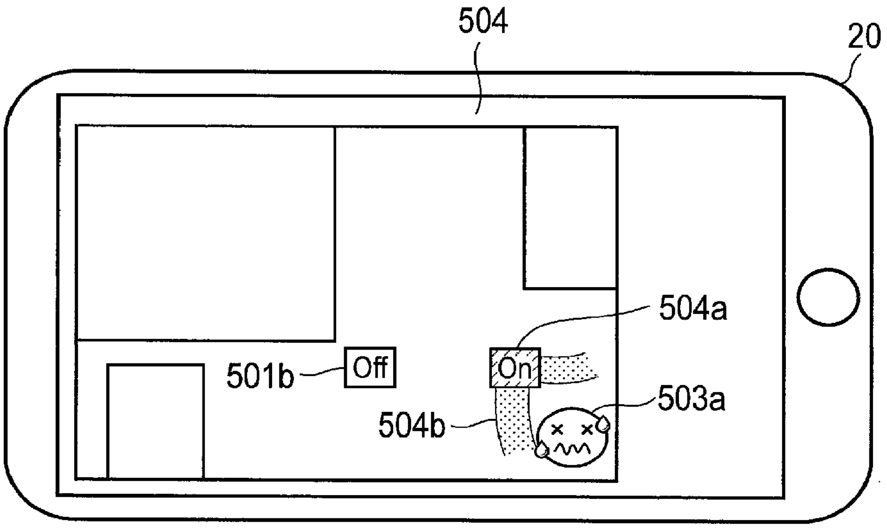
F I G. 20

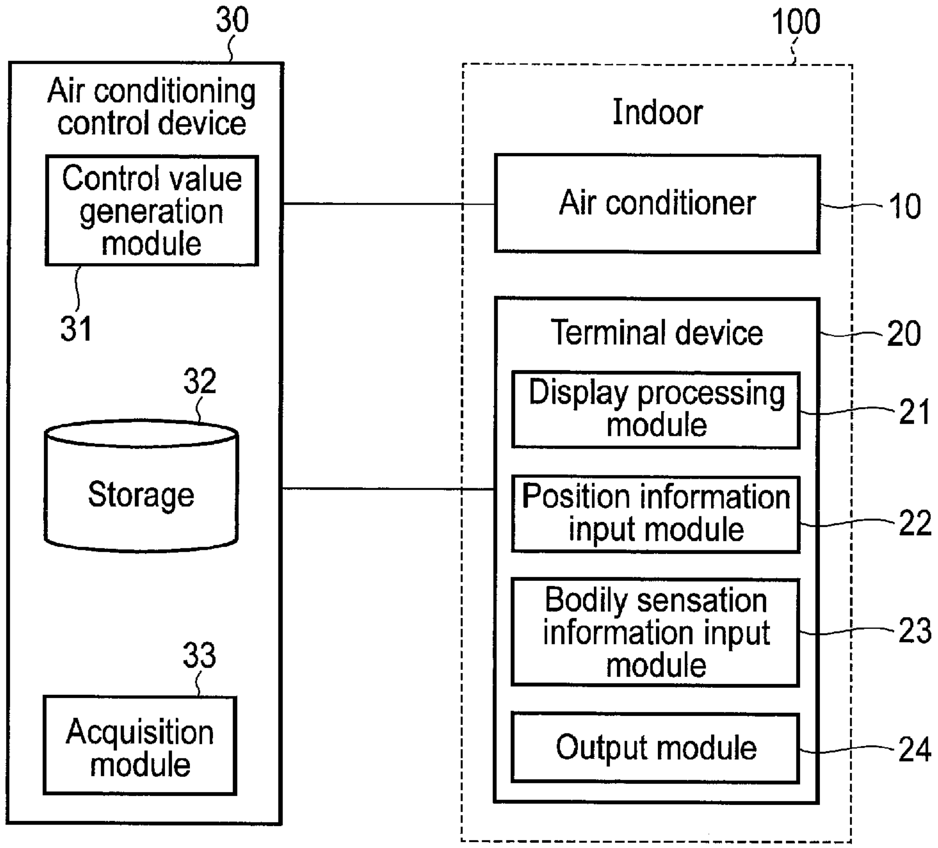
F I G. 21

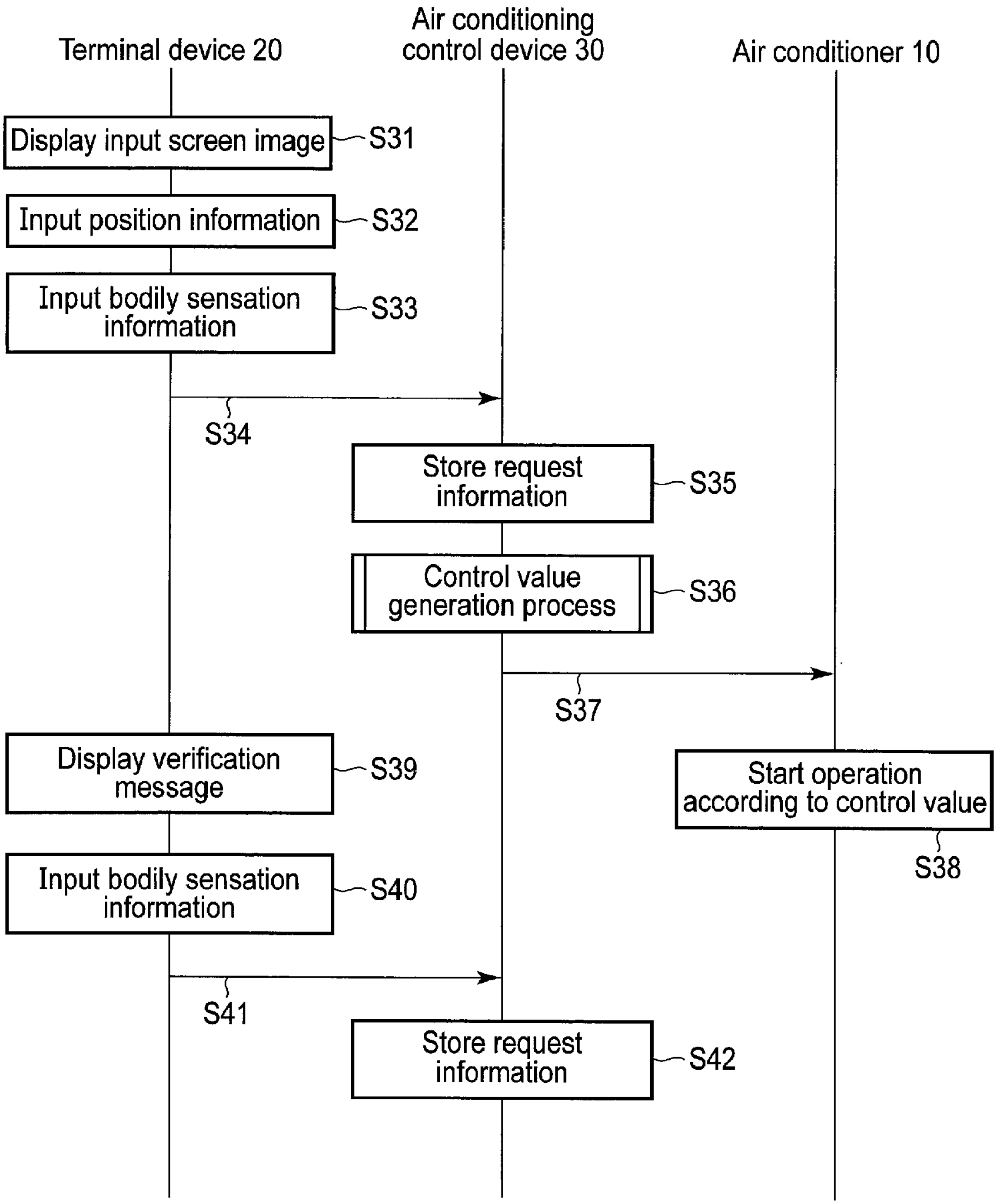
F I G. 22

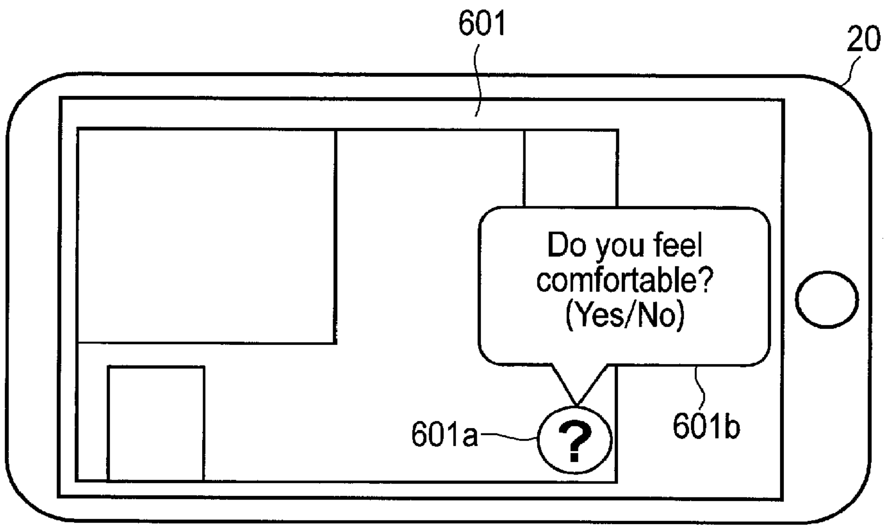
F I G. 23
32
| Date and time | Personal ID | Position information | Bodily sensation information |
|---|---|---|---|
| 7/25 8:00 | A | (20, 3) | +2 |
| 7/25 8:15 | A | (20, 3) | 0 |
| 7/25 9:00 | B | (10, 5) | -1 |
| 7/25 9:15 | B | (10, 5) | 0 |
| 7/25 10:00 | A | (20, 3) | +2 |
| 7/25 10:08 | B | (10, 5) | +2 |
| 7/25 10:12 | C | (15, 10) | +1 |
32a
32b
F I G. 24

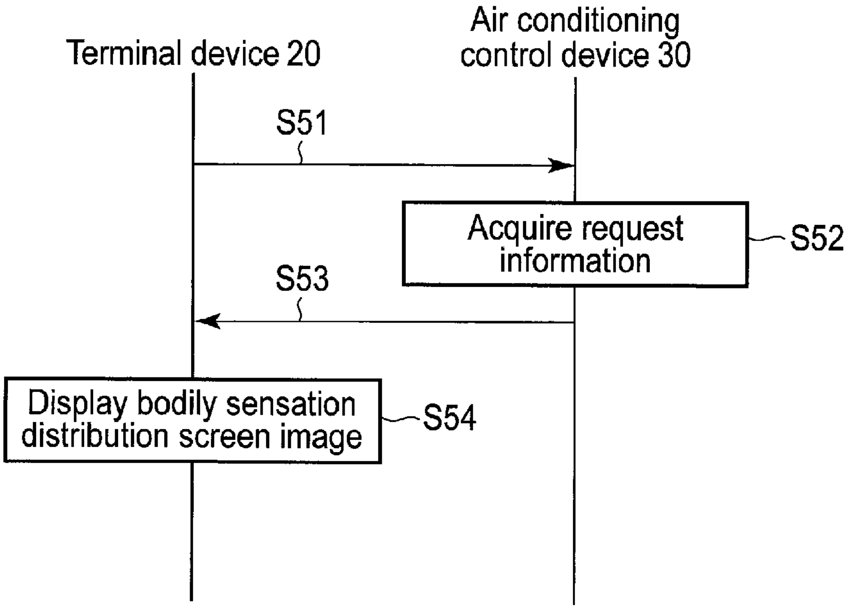
F I G. 25
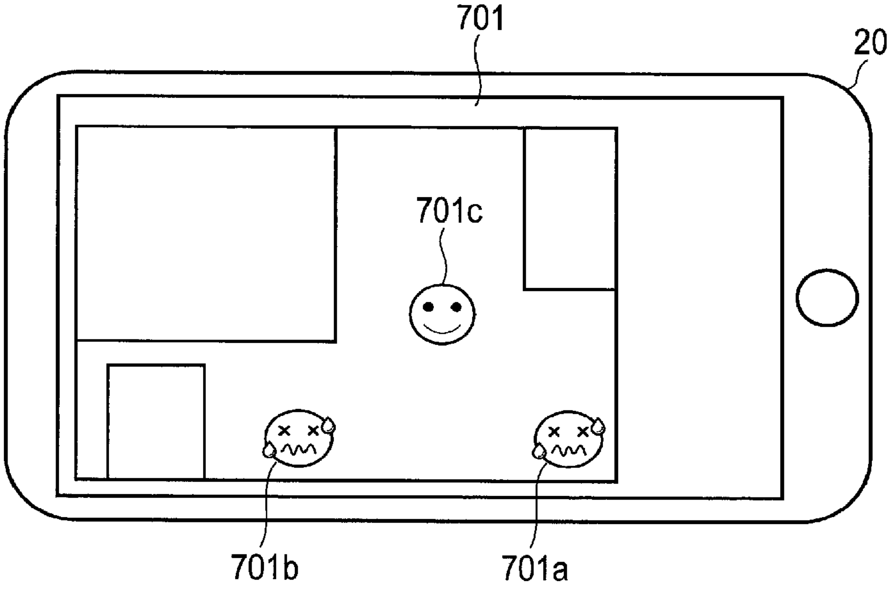
F I G. 26

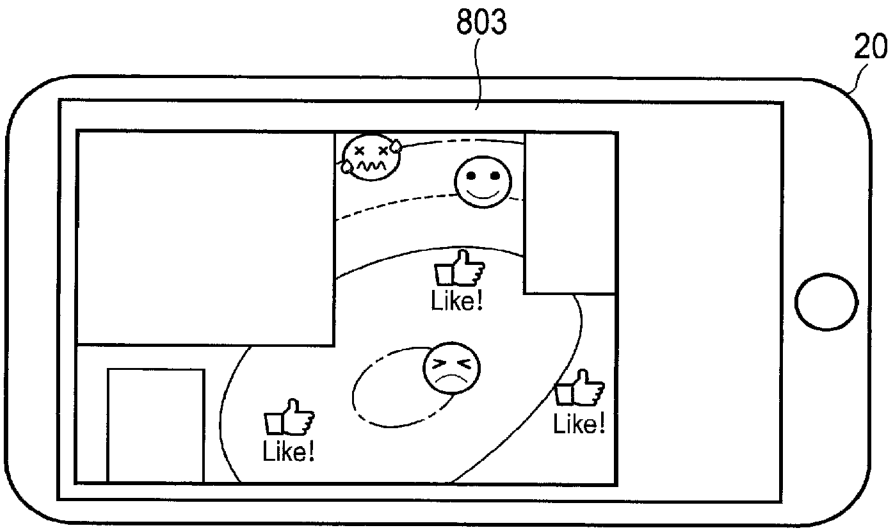
F I G. 29
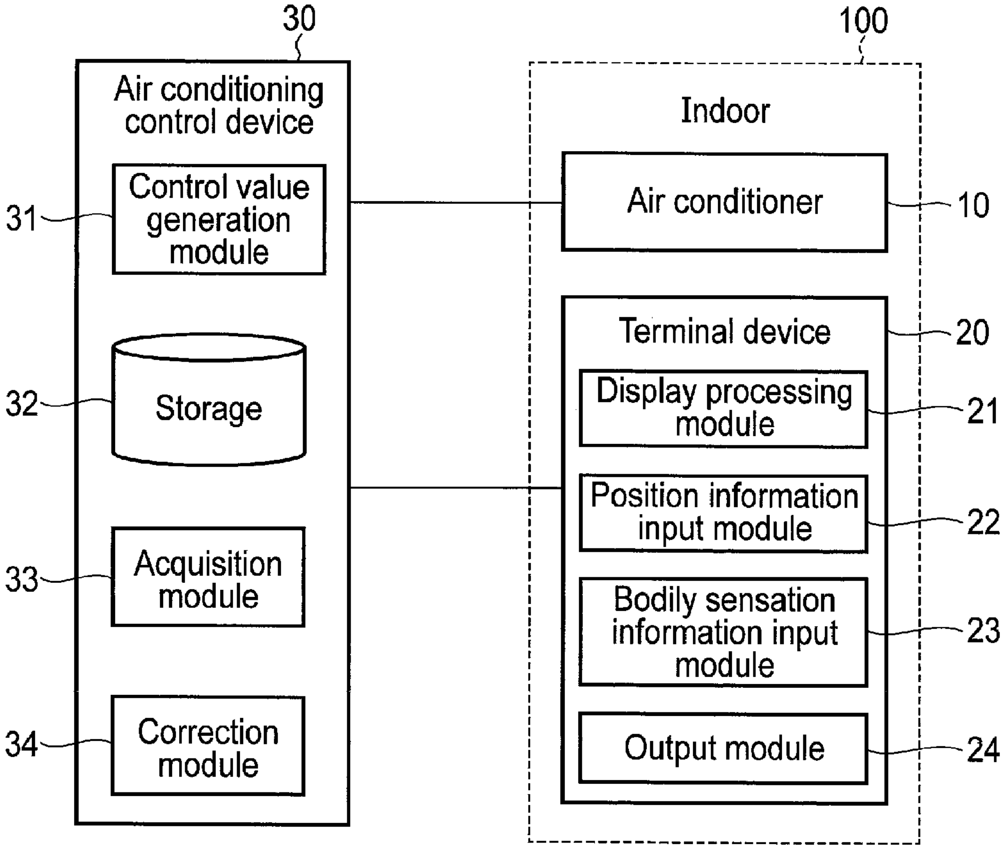
F I G. 30

| Personal ID | Thermal sensation tolerance value | |
|---|---|---|
| A | +1 | 34a |
| B | −1 | 34b |
| C | 0 | 34c |
F I G. 31
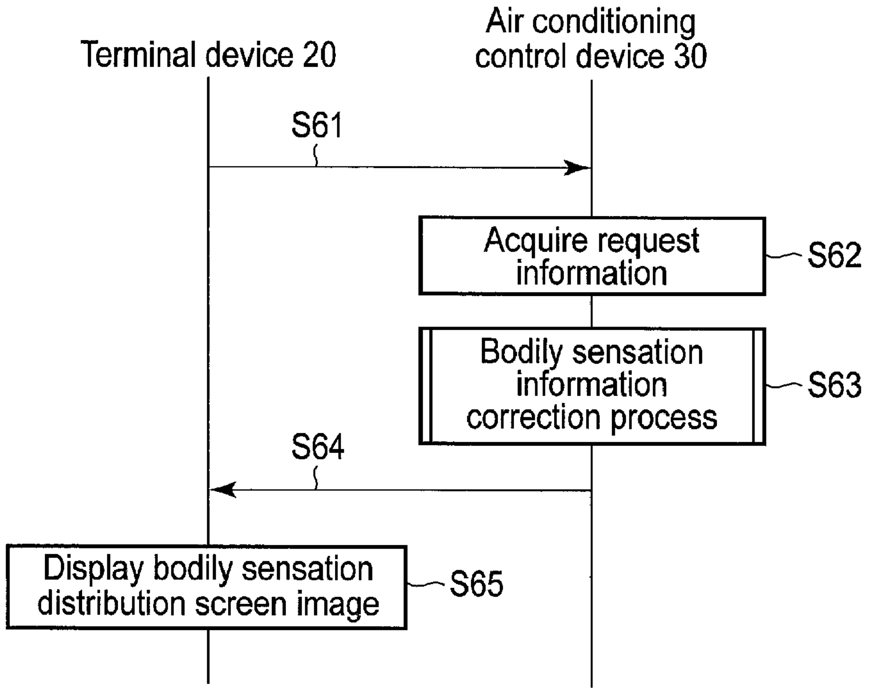
F I G. 32

TERMINAL DEVICE, STORAGE MEDIUM AND AIR CONDITIONING SYSTEM

CROSS-REFERENCE TO RELATED APPLICATIONS

This application is based upon and claims the benefit of priority from Japanese Patent Applications No. 2018-164612, filed Sep. 3, 2018; and No. 2019-037732, filed Mar. 1, 2019, the entire contents of all of which are incorporated herein by reference.

FIELD

Embodiments described herein relate generally to a terminal device, a storage medium, and an air conditioning system.

BACKGROUND

In general, an air conditioner is installed in an indoor space such as an office, and the operation of the air conditioner is controlled by a user in the indoor space operating a remote control or the like of the air conditioner.

Here, for example, when the user feels that the comfort level of the indoor space is low, the user can perform an operation to change the set temperature etc. of the air conditioner.

However, depending on the position of the user in the indoor space, there are cases where the setting that provides the desired air conditioning effect for the user is not clear and it is difficult to improve the comfort level of the user.

Therefore, in order to improve the comfort level of the user, it is required to use information different from information obtained in response to an operation on a general remote controller or the like.

BRIEF DESCRIPTION OF THE DRAWINGS

FIG. 2 is a diagram showing an example of a configuration of an air conditioning system.

FIG. 3 is a diagram showing an example of a hardware configuration of a terminal device.

FIG. 4 is a diagram showing an example of a hardware configuration of an air conditioning control device.

FIG. 5 is a sequence chart showing an example of a processing procedure of the air conditioning system.

FIG. 11 is a diagram showing an example of control values generated when an air conditioner is in operation.

FIG. 12 is a diagram showing an example of control values generated when the air conditioner is not in operation.

FIG. 13 is a diagram showing an example of a configuration of an air conditioning system according to a second embodiment.

FIG. 15 is a diagram showing an example of a first input screen image displayed on a terminal device.

FIG. 16 is a diagram showing an example of a second input screen image displayed on the terminal device.

FIG. 17 is a diagram showing an example of a first request verification screen image displayed on a terminal device.

FIG. 18 is a diagram showing an example of air conditioner information.

FIG. 19 is a diagram showing an example of a second request verification screen image displayed on a terminal device.

FIG. 20 is a view for explaining a case where icons representing wind volume and wind direction are displayed.

FIG. 21 is a diagram showing an example of a configuration of an air conditioning system according to a third embodiment.

FIG. 22 is a sequence chart showing an example of a processing procedure of the air conditioning system when controlling the operation of an air conditioner based on request information input in a terminal device.

FIG. 23 is a view showing an example of an air conditioning state verification screen image.

FIG. 24 is a diagram showing an example of a data structure of request information.

FIG. 25 is a sequence chart showing an example of a processing procedure of an air conditioning system when request information from different users is displayed on a terminal device.

FIG. 26 is a view showing an example of a bodily sensation distribution screen image.

FIG. 29 is a view showing still another example of a bodily sensation distribution screen image.

FIG. 30 is a diagram showing an example of a configuration of an air conditioning system according to a fourth embodiment.

FIG. 31 is a diagram showing an example of a data structure of thermal sensation tolerance information.

FIG. 32 is a sequence chart showing an example of a processing procedure of an air conditioning system when displaying request information of different users on a terminal device.

DETAILED DESCRIPTION

In general, according to one embodiment, a terminal device used by a user in an indoor space in which an air conditioner is installed includes a processor. The processor is configured to input position information indicating a position of the user in the indoor space, input first bodily sensation information indicating an air conditioning state felt by the user, and output the input position information and the input first bodily sensation information to an external device.

Various embodiments will be described with hereinafter reference to the accompanying drawings.

First Embodiment

First, with reference to FIG. 1, the outline of an air conditioning system according to a first embodiment will be described. The air conditioning system according to the present embodiment is used by, for example, a user in an indoor space in which an air conditioner 10 is installed.

Figure 1:
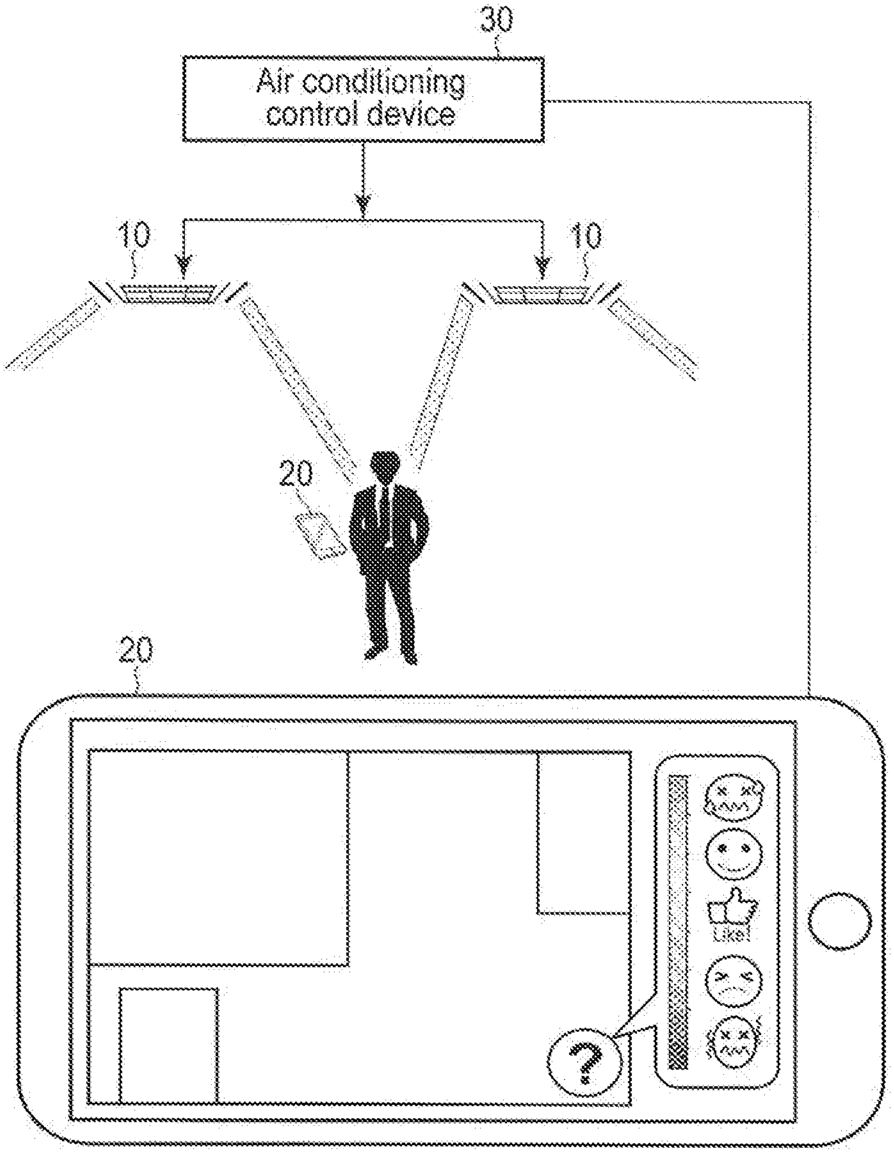
FIG. 1 is a diagram for explaining an outline of an air conditioning system according to a first embodiment.

In the air conditioning system shown in FIG. 1, the user can input a request (request information) from the user to the air conditioner 10 by operating a terminal device 20.

The user can input a request to the air conditioner 10 via an input screen image (GUI: Graphical User Interface) displayed on the terminal device 20 as shown in FIG. 1, for example. The detail of the input screen image will be described later.

In addition, in the air conditioning system according to the present embodiment, the terminal device 20 is connected to an air conditioning control device 30. The air conditioning control device 30 receives from the terminal device 20 a request to the air conditioner 10 input in the terminal device 20 and controls the operation of the air conditioner 10 according to the request.

Hereinafter, the air conditioning system according to the present embodiment will be specifically described. First, with reference to FIG. 2, an example of the configuration of the air conditioning system according to the present embodiment will be described. As shown in FIG. 2, the air conditioning system includes the air conditioner 10, the terminal device 20, and the air conditioning control device 30.

The air conditioner 10 is installed in an indoor space 100 as described above. In the present embodiment, the indoor space 100 in which the air conditioner 10 is installed is assumed to be a space such as one room in a building, for example, but it may be a section within the facility, and a space or the like divided by a floor, an inner wall, etc.

In addition, although only one air conditioner 10 is shown for convenience in FIG. 2, the number of air conditioners provided in the air conditioning system according to the present embodiment may be one or plural.

The terminal device 20 includes a portable terminal (electronic equipment) such as a smartphone and a tablet terminal used by the user in the indoor space 100. Note that the air conditioning system according to the present embodiment may include a plurality of terminal devices 20 used by a plurality of users or a single terminal device 20 commonly used by the plurality of users.

The terminal device 20 includes a display processing module 21, a position information input module 22, a bodily sensation information input module 23, and an output module 24.

The display processing module 21 displays on the terminal device 20 an input screen image including a floor map of the indoor space 100 (room layout). It is assumed that the data (data that is configured to display the floor map) relating to the floor map of the indoor space 100 is stored in the storage (not shown) of the terminal device 20 in advance, for example.

The position information input module 22 inputs position information indicating the position of the user in the indoor space 100 in accordance with the operation of the user, on the input screen image displayed by the display processing module 21.

The bodily sensation information input module 23 inputs bodily sensation information (first bodily sensation information) indicating the air conditioning state felt by the user in accordance with the operation of the user, on the input screen image displayed by the display processing module 21.

The output module 24 outputs the position information input by the position information input module 22 and the bodily sensation information input by the bodily sensation information input module 23 to an external device. The position information and the bodily sensation information correspond to the request information (the request information from the user) indicating the request from the user to the air conditioner 10 in the indoor space 100 described above.

Note that the external device serving as the output destination of the position information and the bodily sensation information, for example, includes the air conditioning control device 30.

The air conditioning control device 30 is communicably connected to the terminal device 20. The air conditioning control device 30 includes a control value generation module 31.

The control value generation module 31 receives the position information and bodily sensation information output (transmitted) by the output module 24. The control value generation module 31 generates a parameter value (hereinafter referred to as a control value of the air conditioner 10) that is configured to control the operation of the air conditioner 10 based on the received position information and bodily sensation information. The operation of the air conditioner 10 is controlled based on the control value of the air conditioner 10 generated by the control value generation module 31.

FIG. 3 shows an example of a hardware configuration of the terminal device 20. Here, a case where the terminal device 20 is, for example, a smartphone will be described.

As shown in FIG. 3, the terminal device 20 includes a CPU 201, a nonvolatile memory 202, a main memory 203, a communication device 204, a touch screen image display 205, and the like.

The CPU 201 is a hardware processor that is configured to control the operation of each component in the terminal device 20. The CPU 201 executes various programs loaded from the nonvolatile memory 202 which is a storage device into the main memory 203. The programs executed by the CPU 201 include an operating system (OS) and an application program (hereinafter referred to as an air conditioning application) for a user to use the air conditioning system, and the like.

In the present embodiment, it is assumed that some or all of the modules 21 to 24 included in the terminal device 20 shown in FIG. 2 are implemented by causing the CPU 201 to execute the air conditioning application, that is, by software. Note that some or all of these modules 21 to 24 may be implemented by hardware such as an IC (Integrated Circuit), or may be implemented by a combination of software and hardware.

The communication device 204 is a device configured to perform wired or wireless communication with an external device such as the above air conditioning control device 30 or the like. Note that the communication device 204 may be configured to perform communication with the air conditioner 10 in addition to the air conditioning control device 30.

The touch screen display 205 is attached so as to be superimposed on the upper surface of the main body of the terminal device 20 (for example, a smartphone). The touch screen display 205 incorporates a flat panel display and a sensor configured to detect the contact position of, for example, a finger or the like on the screen of the flat panel display. The flat panel display includes, for example, a liquid crystal display (LCD) or the like. As the sensor, for example, a capacitance type touch panel or the like can be used.

According to the touch screen display 205, it is possible to detect the operation of the user, (for example, a touch operation or the like) on the screen of the terminal device 20 (flat panel display).

FIG. 4 shows an example of a hardware configuration of the air conditioning control device 30. As shown in FIG. 4, the air conditioning control device 30 includes a CPU 301, a nonvolatile memory 302, a main memory 303, a communication device 304, and the like.

The CPU 301 is a hardware processor that is configured to control the operation of each component in the air conditioning control device 30. The CPU 301 executes various programs loaded from the nonvolatile memory 302 which is a storage device into the main memory 303. The programs executed by the CPU 301 include an operating system (OS), an application program (hereinafter referred to as an air conditioning control program) that is configured to control the operation of the air conditioner 10, and the like.

In FIG. 4, it is assumed that the air conditioning control device 30 includes the CPU 301. However, as long as the air conditioning control device 30 is capable of executing the air conditioning control program, the air conditioning control device 30 may include a processor other than the CPU 301, a controller, or the like.

In the present embodiment, it is assumed that part or the entire of the control value generation module 31 included in the above air conditioning control device 30 shown in FIG. 2 is implemented by causing the CPU 301 to execute the air conditioning control program, that is, by software. Part or the entire of the control value generation module 31 may be implemented by hardware such as an IC, or may be implemented by a combination of software and hardware.

The communication device 304 is a device configured to perform wired or wireless communication, for example, with an external device such as the air conditioner 10 and the terminal device 20.

Next, an example of the processing procedure of the air conditioning system according to the present embodiment will be described with reference to the sequence chart of FIG. 5.

First, a user using the air conditioning system activates the above mentioned air conditioning application on the terminal device 20 by operating the terminal device 20.

When the air conditioning application is activated on the terminal device 20, the display processing module 21 included in the terminal device 20 displays an input screen image including the floor map such as a stereoscopic view and the plan view of the indoor space 100 on the terminal device 20 (step S1).

Here, the user can perform an operation of designating the position of the user on the input screen image (floor map) displayed on the terminal device 20 in step S1.

The position information input module 22 inputs position information indicating the position designated by the user based on the above-described operation of designating the position of the user (step S2).

Furthermore, when the process of step S2 is performed, the user can perform an operation of designating the air conditioning state felt by the user on the input screen image displayed on the terminal device 20 in step S1.

The bodily sensation information input module 23 inputs bodily sensation information indicating the air conditioning state designated by the user based on an operation of designating the air conditioning state felt by the user (step S3).

Next, as a request from the user to the air conditioner 10, the output module 24 transmits (outputs) the request information including the position information input in step S2 and the bodily sensation information input in step S3 to the air conditioning control device 30 (step S4).

When the process of step S4 is performed, the air conditioning control device 30 receives the request information transmitted in step S4.

The control value generation module 31 included in the air conditioning control device 30 performs a control value generation process based on the received request information (position information and bodily sensation information) (step S5). A control value of the air conditioner 10 is generated in this control value generation process.

In the present embodiment, the control value of the air conditioner 10 is a value of a control factor that can be operated (indicated) by, for example, a remote controller or the like in the air conditioner 10. By changing this control value, it is possible to change the manner of air conditioning (that is, air conditioning state) such as the heat and air current supplied from the air conditioner 10 to various places in the indoor space 100. Details of the control value generation process and the control value will be described later.

The control value (control signal) of the air conditioner 10 generated in the process of step S5 is transmitted to the air conditioner 10 (step S6).

The air conditioner 10 includes a built-in microcontroller or the like that is configured to control the operation of the air conditioner 10. The microcontroller controls the operation of the air conditioner 10 according to the control value transmitted in step S6, and performs air conditioning of the indoor space 100 (step S7).

Here, the transition of the screen image displayed on the terminal device 20 in the case where the processing shown in FIG. 5 is performed will be specifically described.

Figure 6:
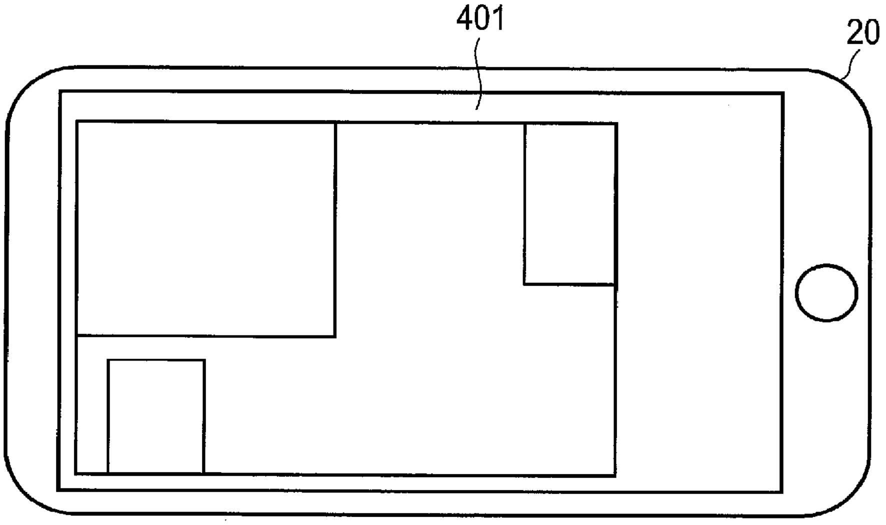
FIG. 6 is a diagram showing an example of a first input screen image displayed on the terminal device.

First, when the air conditioning application is activated on the terminal device 20 based on the operation of the user, a first input screen image shown in FIG. 6 is displayed on the terminal device 20. As shown in FIG. 6, a first input screen image 401 includes a floor map of the indoor space 100 in which the air conditioner 10 is installed.

Here, the user can designate (for example, touch) the position of the user in the indoor space 100 on the floor map in the first input screen image 401. When the position is designated by the user, the first input screen image 401 displayed on the terminal device 20 changes to a second input screen image 402 shown in FIG. 7.

Figure 7:
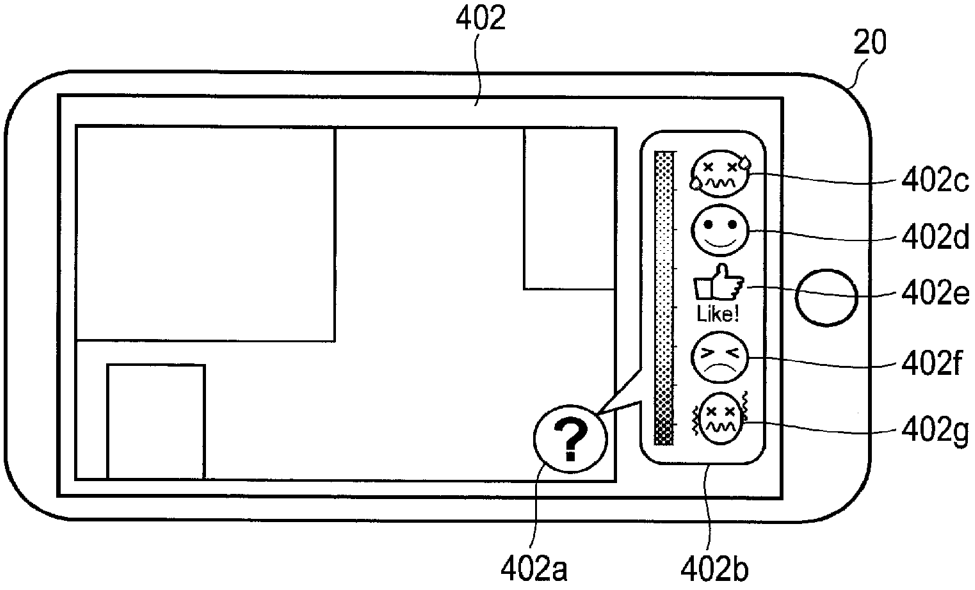
FIG. 7 is a diagram showing an example of a second input screen image displayed on the terminal device.

In the second input screen image 402 shown in FIG. 7, an icon 402*a* represents the position of the user designated by the user. In addition, an air conditioning state selection region 402*b* is provided in the vicinity of the icon 402*a* representing the position of the user displayed on the second input screen image 402.

The air conditioning state selection region 402*b* is shown as, for example, a pop-up, and a plurality of icons (symbols) 402*c* to 402*g* indicating each air conditioning state that can be selected by the user is arranged in the air conditioning state selection region 402*b*.

In the present embodiment, the air conditioning state that can be selected by the user corresponds to the comfort level or the like that the user feels, and includes, for example, concepts such as "hot" or "cold" that is felt in the indoor space 100.

Specifically, in the example shown in FIG. 7, the icon 402*c* represents an air conditioning state which is felt as "too hot". The icon 402*d* represents an air conditioning state which is felt as "hot". The icon 402*e* represents an air conditioning state which is felt as "comfortable". The icon 402*f* represents an air conditioning state which is felt as "cold". The icon 402*g* represents an air conditioning state which is felt as "too cold".

In the present embodiment, a level of (the air conditioning state represented by) the icon 402*c* whose state felt hot is higher than a level of the icon 402*d*. Also, it is assumed that the level of (air conditioning state represented by) the icon 402*g* whose state felt cold is higher than the level of icon 402*f*.

When such a second input screen image 402 is displayed on the terminal device 20, the user can select (touch) one of the plurality of icons 402*c* to 402*g* in the air conditioning state selection region 402*b*. When one icon is selected by the user, the position (position information) designated by the user and the air conditioning state (bodily sensation information) represented by the icon selected by the user are linked, and one request information is determined (generated).

Figures 8, 9:
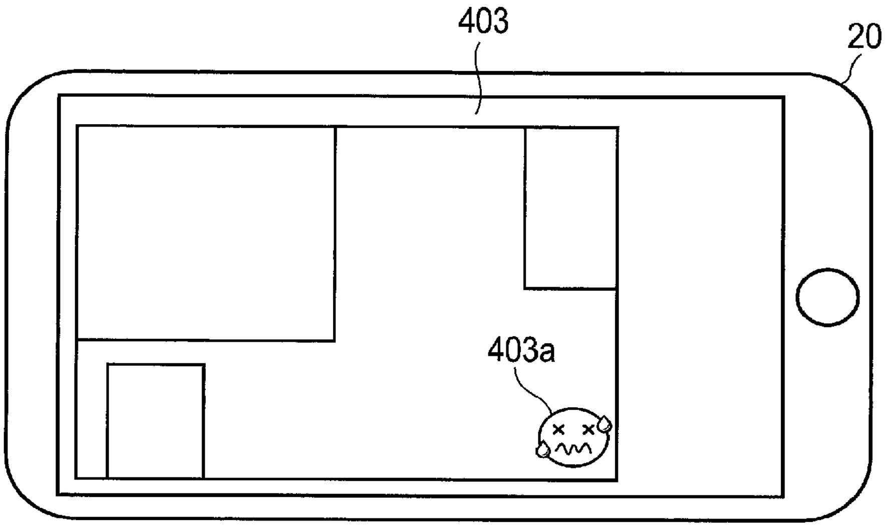
FIG. 8 is a diagram showing an example of a request verification screen image displayed on a terminal device.
FIG. 9 is a diagram showing an example of a data structure of request information.

Next, the second input screen image 402 displayed on the terminal device 20 changes to the screen image shown in FIG. 8. FIG. 8 shows an example of a screen image (hereinafter referred to as request verification screen image) displayed when the user selects the icon 402*c* in the air conditioning state selection region 402*b* provided on the second input screen image 402 shown in FIG. 7.

On a request verification screen image 403 shown in FIG. 8, the icon 403*a* same as the icon 402*c* selected in the second input screen image 402 (the air conditioning state selection region 402*b*) is displayed at the position designated by the user on the first input screen image 401.

Here, on the request verification screen image 403, the position of the icon 403*a* corresponds to the position designated by the user (that is, the position information indicating the position of the user), and the air conditioning state represented by the icon 403*a* corresponds to an air conditioning state selected by the user (that is, bodily sensation information indicating an air conditioning state felt by the user). In other words, the request information (the position information and the bodily sensation information) described above is displayed on the request verification screen image 403, and the user verifies that the request information from the user has been input in the terminal device 20.

Although the explanation is omitted here, the position of the user (position information) and the air conditioning state (bodily sensation information) felt by the user may be repeatedly corrected (changed) according to the movement of the user or the operation of the air conditioner 10.

When the position of the user is designated on the first input screen image as described above, position information indicating the position is input by the position information input module 22, and when the icon representing the air conditioning state felt by the user on the second input screen image is selected, bodily sensation information indicating the air conditioning state is input by the bodily sensation information input module 23. The position information and bodily sensation information input in this manner are transmitted from the terminal device 20 to the air conditioning control device 30 as the above request information.

Here, FIG. 9 shows an example of the data structure of the request information. As shown in FIG. 9, the request information includes position information and bodily sensation information in association with each other.

The position information indicates, for example, a relative position (relative coordinates) from the predetermined position of the indoor space 100. In the example shown in FIG. 9, the position information "20, 3" is included in the request information, and the position information "20, 3" indicates, for example, the position 20 in the north and the position 3 in the west from the predetermined position in the indoor space 100. Note that the position information may indicate an absolute position (absolute coordinates) such as latitude and longitude as long as it is possible to indicate the position of the user. Further, the position information may indicate altitude (above sea level) or the like.

The bodily sensation information indicates an air conditioning state (air conditioning state felt by the user) represented by the icon selected by the user as described above. In the bodily sensation information, the air conditioning state felt by the user is represented by numerical values, for example. Specifically, when the user selects the icon 402*c* representing the air conditioning state that the user feels "hot", the bodily sensation information indicating the air conditioning state is "+2". Further, it is assumed that, when the user selects the icon 402*d* representing the air conditioning state that the user feels "hot", the bodily sensation information indicating the air conditioning state is "+1". In addition, when the user selects the icon 402*e* representing the air conditioning state that the user feels as "comfortable", the bodily sensation information indicating the air conditioning state is "±0". Furthermore, when the user selects the icon 402*f* representing the air conditioning state that the user feels "cold", the bodily sensation information indicating the air conditioning state is "−1". Also, when the user selects the icon 402*g* representing the air conditioning state that the user feels "too cold", the bodily sensation information indicating the air conditioning state is "−2".

In the request information shown in FIG. 9, bodily sensation information (that is, +2) when the icon 402*c* is selected in the second input screen image 402 (the air conditioning state selection region 402*b*) shown in FIG. 7 is indicated.

Next, with reference to the flowchart shown in FIG. 10, an example of the processing procedure of the above-described control value generation process (the process of step S5 shown in FIG. 5) will be described. This control value generation process is performed by the control value generation module 31 included in the air conditioning control device 30 when the request information as shown in FIG. 9 is transmitted from the terminal device 20 to the air conditioning control device 30.

In the present embodiment, the air conditioning control device 30 manages (grasps), for example, the position of the air conditioner 10 that the air conditioning system is provided with (the air conditioner 100 installed in the indoor space 100) in the indoor space 100, the operation state of the air conditioner 10, and the like.

The control value generation module 31 determines whether the bodily sensation information included in the request information transmitted from the terminal device 20 is "±0" (that is, whether the air conditioning state that is felt by the user and which is indicated by the bodily sensation information is "comfortable") (step S11).

When it is determined that the bodily sensation information is not "±0" (NO in step S11), the control value generation module 31 selects the air conditioner 10 that is configured to control the operation (step S12). For example, when the air conditioning system includes only one air conditioner 10, the air conditioner 10 is selected in step S12. On the other hand, for example, when the air conditioning system includes a plurality of air conditioners 10, in step S12, the air conditioner 10 installed closest to the position of the user indicated by the position information included in the request information is selected based on the positions in the indoor space 100 of the air conditioners 10 managed by the air conditioning control device 30 as described above. Hereinafter, the air conditioner 10 selected in step S12 will be referred to as the target air conditioner 10.

Next, based on the operation state of the air conditioner 10 managed by the air conditioning control device 30, the control value generation module 31 determines whether the target air conditioner 10 is in operation (that is, whether the start/stop state of the air conditioner 10 is ON) (step S13).

When it is determined that the target air conditioner 10 is in operation (YES in step S13), the control value generation module 31 determines the amount of change with respect to the current set temperature of the target air conditioner 10 based on the bodily sensation information included in the request information (step S14).

The amount of change with respect to the set temperature determined in step S14 is a numerical value corresponding to the width for increasing or decreasing the set temperature. Specifically, for example, in a case where the target air conditioner 10 is operating in the cooling mode, when the bodily sensation information included in the request information is "+2" (that is, the user feels that it is too hot), "−2° C." is determined as the amount of change with respect to the set temperature in step S14. Further, for example, in a case where the target air conditioner 10 is operating in the cooling mode, when the bodily sensation information included in the request information is "−1" (that is, the user feels that it is cold), "+1° C." is determined as the amount of change with respect to the set temperature in step S14.

Here, for example, the case where the target air conditioner 10 operates in the cooling mode has been described, but the same applies to the case where the target air conditioner 10 operates in the heating mode.

Next, the control value generation module 31 determines the wind volume and wind direction of the current target air conditioner 10 based on the position information and bodily sensation information included in the request information (step S15). When the target air conditioner 10 can blow out wind, for example, in a plurality of directions (way), the control value generation module 31 determines, in step S15, the wind volume in which the air conditioning state that is felt by the user and which is indicated by the bodily sensation information included in request information at the position indicated by the position information included in the request information moves toward "comfort" and the direction in which the wind of the wind volume is blown out.

The control value generation module 31 generates a control value of the target air conditioner 10 based on the amount of change with respect to the set temperature determined in step S14, and the wind volume and the wind direction determined in step S15 (step S16).

On the other hand, when it is determined in step S13 that the target air conditioner 10 is not in operation (NO in step S13), the control value generation module 31 determines the operation mode of the target air conditioner 10 (step S17). Note that the operation mode of the target air conditioner 10 determined in step S17 includes, for example, the cooling mode and the heating mode.

Here, for example, a room temperature meter that measures the temperature (room temperature) of the indoor space 100 is provided in the indoor space 100 or the target air conditioner 10 is provided with the room temperature meter, and the room temperature measured by the room temperature meter is managed by the air conditioning control device 30. In this case, in step S17, it is possible to determine the operation mode (cooling mode or heating mode) of the target air conditioner 10 based on the room temperature managed by the air conditioning control device 30.

When the process of step S17 is performed, the control value generation module 31 generates a control value for starting an operation of the target air conditioner 10 in the operation mode determined in step S17 (step S16).

Hereinafter, a specific example of the control value generated in step S16 shown in FIG. 10 will be described.

First, FIG. 11 shows an example of control values generated in step S16 when it is determined in step S13 that the target air conditioner 10 is in operation.

As shown in FIG. 11, the control value includes the start/stop state, the operation mode, the set temperature, the wind volume, and the wind direction in association with the air conditioner ID.

The air conditioner ID is an identifier for identifying the air conditioner (target air conditioner) 10. The start/stop state indicates whether to change the start/stop state of the air conditioner 10 identified by the associated air conditioner ID (that is, whether the operation is started or the operation is stopped).

The operation mode indicates whether to change the current operation mode (that is, the cooling mode or the heating mode) of the air conditioner 10 identified by the associated air conditioner ID. The set temperature indicates whether to change the current set temperature of the air conditioner 10 identified by the associated air conditioner ID.

The wind volume indicates whether to change the amount of wind blown out from the air conditioner 10 identified by the associated air conditioner ID (that is, the current wind volume of the target air conditioner 10).

The wind direction indicates whether wind is blown out in a certain direction from the air conditioner 10 identified by the associated air conditioner ID. In the present embodiment, for example, it is assumed that an air conditioner 10, which is an overhead cassette type, is capable of blowing wind in four directions of east, west, north, and south, but at least one direction among these four directions may be omitted as the wind direction, or another direction may be further included in the wind direction. Further, when the air conditioner 10 is, for example, a floor type, the wind direction may be determined by a combination of a horizontal angle and an elevation angle.

In the example shown in FIG. 11, the control value which is associated with the air conditioner ID "1" includes the start/stop state "no change", the operation mode "no change", the set temperature "−2° C.", the wind volume "+1", wind direction (east) "1", wind direction (south) "0", wind direction (west) "0", and wind direction (north) "1".

As described above, the control value shown in FIG. 11 is a control value that is generated when it is determined that the target air conditioner 10 is in operation, and the start/stop state "no change" and the operation mode "no change", which are included in the control value, indicate that the operation of the air conditioner 10 identified by the air conditioner ID "1" is continued without changing the operation mode. In addition, the set temperature "−2° C." indicates that the current set temperature of the air conditioner 10 identified by the air conditioner ID "1" is lowered by 2° C. In addition, the wind volume "+1" indicates that the current wind volume of the air conditioner 10 identified by the air conditioner ID "1" is increased by one level.

Here, in the present embodiment, it is assumed that the wind direction in respective directions included in the control value includes “1” indicating that the wind is blown out in the direction and “0” indicating that the wind is not blown in the direction. In this case, according to the wind direction included in the control value shown in FIG. 11, it is shown that the wind is blown out in the east and north directions and the wind is not blown in the south direction and the west direction. In the present embodiment, it is assumed that the wind direction in respective directions included in the control value includes “1” and “0”, but the wind direction may include other values depending on the elevation angle of the wind wing that is controlled to make air conditioning effective to further distance.

That is, when the control value shown in FIG. 11 is transmitted to the air conditioner (target air conditioner) 10 identified by the air conditioner ID “1”, the air conditioner 10 blows out the wind of the wind volume increased by one step in the east and north directions, and performs air conditioning so that the set temperature is 2° C. lower than the current set temperature.

Next, FIG. 12 shows an example of control value generated in step S16 when it is determined in step S13 that the target air conditioner 10 is not in operation.

In the example shown in FIG. 12, the control value which is associated with the air conditioner ID “1” includes the start/stop state “On”, the operation mode “cooling”, the set temperature “no change”, the wind volume “no change”, the wind direction (east) “1”, wind direction (south) “1”, wind direction (west) “1”, and wind direction (north) “1”.

As described above, the control value shown in FIG. 12 is a control value that is generated when it is determined that the target air conditioner 10 is not in operation, and the start/stop state “On” and the operation mode “cooling”, which are included in the control value, indicate that the air conditioner 10 identified by the air conditioner ID “1” is turned on and the operation of the air conditioner is started in the cooling mode.

The set temperature “no change” and the wind volume “no change” included in the control value shown in FIG. 12 indicate that there is no change from the default values (set values) of the set temperature and the wind volume when operating the target air conditioner 10 in the above cooling mode. Also, it is assumed that the wind direction included in the control value shown in FIG. 12 also has the default value.

That is, when the control value shown in FIG. 12 is transmitted to the air conditioner (target air conditioner) 10 identified by the air conditioner ID “1”, the operation of the air conditioner 10 is started in the cooling mode with the set temperature, the wind volume, and the wind direction set to the default.

Here, it is described that the set temperature, the wind volume, and the wind direction included in the control value generated when it is determined that the target air conditioner 10 is not in operation has the default value as described above. However, as in the case where it is determined that the target air conditioner 10 is in operation, a control value obtained by changing the set temperature, the wind volume and the wind direction from the default values may be generated based on the request information (the position information and the bodily sensation information).

Although the control value including the start/stop state, the operation mode, the set temperature, the wind volume, and the wind direction has been described, the control value may be one that can control the air conditioner 10 (a value of the control factor of the air conditioner 10). That is, part of the start/stop state, the operation mode, the set temperature, the wind volume and the wind direction may be omitted in the control value, and, for example, the time of a timer for sustaining the operation of the air conditioner 10 (that is, the time for continuously operating the air conditioner 10), and the like may be further included.

Figure 10:
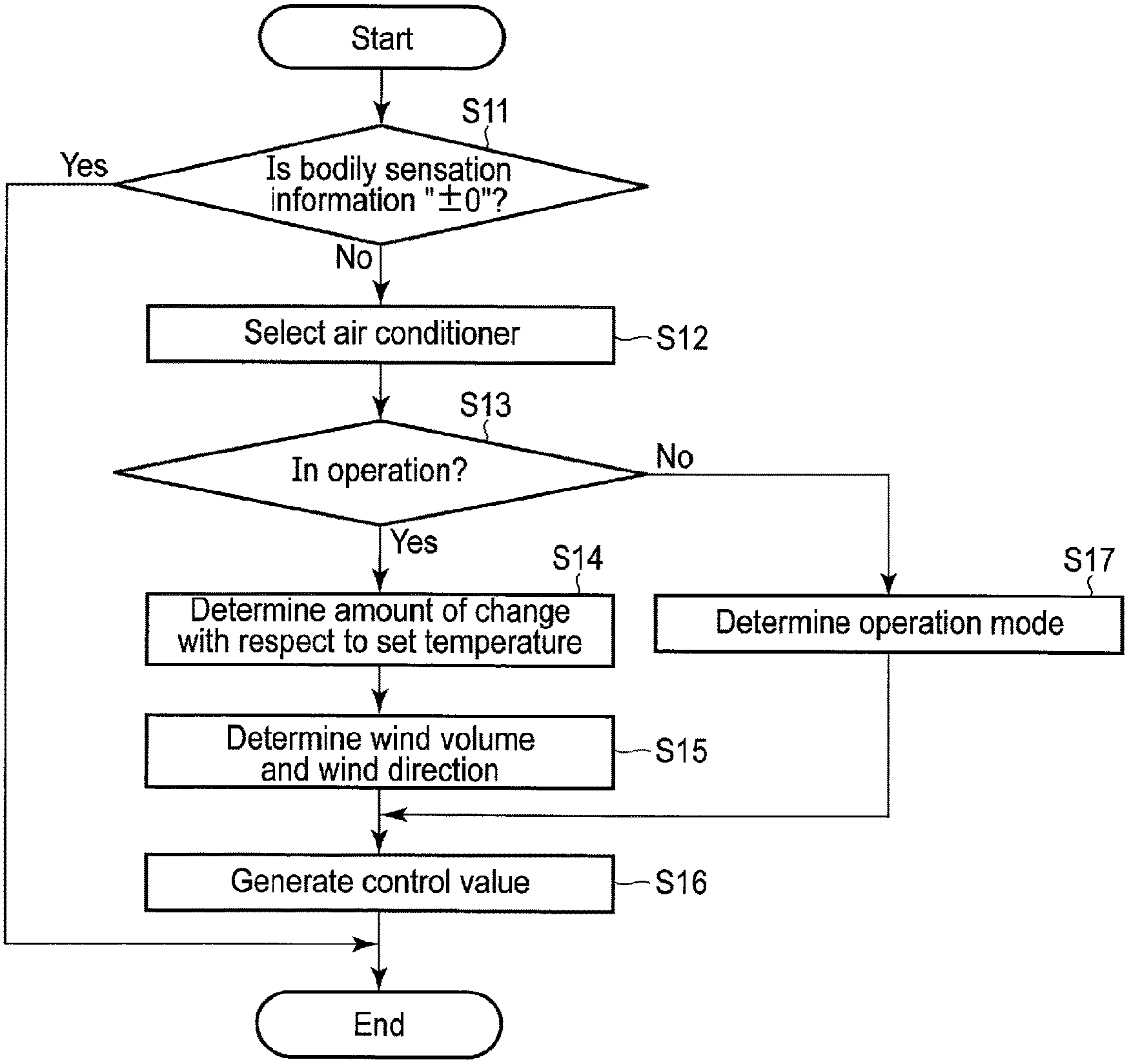
FIG. 10 is a flowchart showing an example of a processing procedure of a control value generation process.

In the control value generation process shown in FIG. 10, the description is made in which the control value of one air conditioner 10 is generated. However, when the air conditioning system includes a plurality of air conditioners 10 as described above, respective control values of the plurality of air conditioners 10 may be generated.

In the case where the air conditioning system is provided with a plurality of air conditioners 10, for example, with respect to the air conditioner 10 installed at a position distant from the position of the user (that is, the air conditioner 10 other than the target air conditioner 10), a control value for maintaining the current operation state of the air conditioner 10 may be generated.

In the above description, the control value of the target air conditioner 10 is generated based on one piece of request information. However, for example, when plural pieced of request information are transmitted from the plurality of terminal devices 20, the process shown in FIG. 10 is performed for request information.

As described above, in the present embodiment, the position information indicating the position of the user in the indoor space and the bodily sensation information (first bodily sensation information) indicating the air conditioning state felt by the user are input and the input position information and the input bodily sensation information are output to the external device. The position information and the bodily sensation information output from the terminal device 20 as described above are used for the process of improving, for example, the comfort level of the user in the external device.

Specifically, in the present embodiment, the position information and the bodily sensation information are output to, for example, the air conditioning control device 30. In order to improve the comfort level of the user, the air conditioning control device 30 generates a control value for controlling the air conditioner 10 based on the position information and bodily sensation information, and controls the operation of the air conditioner 10.

In the present embodiment, with such a configuration, it is possible to use a request (position information and bodily sensation information) from the user to the air conditioner 10 obtained in the terminal device 20 to improve the comfort level of the user.

Further, in the present embodiment, the input screen image including the floor map of the indoor space 100 is displayed on the terminal device 20, and the position information indicating the position designated by the user on the input screen image (floor map) is input. In the present embodiment, with such a configuration, position information indicating the position of the user can be obtained by an intuitive operation of the user without causing the user to perform complicated operations.

Further, in the present embodiment, a plurality of icons representing the air conditioning state is displayed, and bodily sensation information is input based on the icon selected by the user from among the plurality of displayed icons. In the present embodiment, with such a configuration, it is possible to obtain bodily sensation information indicating an air conditioning state that the user feels with an intuitive operation of the user without causing the user to perform a complicated operation.

That is, in the present embodiment, the user does not need to designate (set) the air conditioner 10 to be operated or the control value of the air conditioner 10 in detail, and it is possible to input a request from the user according to an intuitive operation on the input screen image displayed on the terminal device 20 as described above, so that it is possible to improve the comfort level of the user (enhance the air conditioning effect for the user).

Specifically, in an environment where it is necessary to operate a plurality of air conditioners 10 with one terminal device, complicated operations are often required even to operate the desired air conditioner 10. Therefore, it is more effective to use the terminal device 20 according to the embodiment.

In the present embodiment, the description is made in which the position information and the bodily sensation information are output (transmitted) to the air conditioning control device 30. The position information and bodily sensation information may be output to, for example, an administrator terminal used by an administrator managing the air conditioner 10 (or the air conditioning system), and may be displayed on the administrator terminal. According to such a configuration, the position information and the bodily sensation information can be used, for example, when an administrator controls the operation of the air conditioner 10, and can also be used to improve the comfort level of the user through other systems. Since the air conditioning system according to the present embodiment only needs to obtain request information (position information and bodily sensation information) from the user as described above, it may include, for example, the terminal device 20 and the administrator terminal.

Further, in the present embodiment, a floor map is displayed on the terminal device 20 when the position information is input. The floor map may be a construction drawing in which the layout can be accurately known, or simple drawing in which the shape of the indoor space 100 can be distinguished. Further, by designating a desk, a landmark or the like arranged in the indoor space 100 on the floor map, it may be possible to assist (support) the specification by the user of the position.

Further, in the present embodiment, the description is made in which the position of the user is designated by the user, but the position information indicating the position of the user may be automatically acquired by the GPS function of the terminal device 20, for example. Further, the position information indicating the position of the user may be acquired (estimated) based on, for example, the strength of radio waves of Bluetooth (registered trademark) received and transmitted by the terminal device 20. Furthermore, the position information indicating the position of the user may be acquired by using their combination. With such a configuration, it is possible to prevent incorrect position information from being input, for example, in a case where the user cannot correctly grasp the position of the user in the indoor space 100.

Further, the air conditioning system according to the present embodiment may have a configuration including, for example, the air conditioners 10 arranged in a plurality of indoor spaces. In this case, it is necessary to display on the terminal device 20 the floor map (input screen image) of the indoor space where the user is present among the multiple indoor spaces. The indoor space in which the user is located may be designated by the user, or may be automatically determined based on the position information acquired by the GPS function or the position information acquired based on the radio wave intensity of Bluetooth.

Further, in the present embodiment, description is made in which when bodily sensation information is input, a plurality of icons representing an air conditioning state is displayed (enumerated) on the terminal device 20. For example, a doll or silhouette or the like which seems to sweat so hotly or shiver with cold is displayed, so that the user can more intuitively grasp the state.

Further, in the present embodiment, it is assumed that the terminal device 20 is a smartphone or the like, and the operation of designating the position of the user on the input screen image and the operation for selecting the icon representing the air conditioning state are mainly described as the operation of touching the input screen image. For example, in the case where the touch pen system is adopted on the terminal device 20, an operation of bringing the pen into contact with the input screen image may be performed. Further, the terminal device 20 may be, for example, a personal computer (or a dashboard terminal) or the like that is placed at a fixed position in the indoor space 100. In this case, the operation of designating the position of the user and the operation of selecting the icon representing the air conditioning state on the input screen image may be performed using a mouse, a keyboard or the like.

Second Embodiment

Next, a second embodiment will be described. In the first embodiment described above, description is mainly made in which the operation of an air conditioner 10 is controlled based on the request information (position information and bodily sensation information) input in a terminal device 20. For example, in a case where the operation of the air conditioner 10 not in operation is started (that is, the air conditioner 10 is turned on), it may take time to supply (generate and transmit) the heat until the air conditioner 10 actually performs air conditioning.

In this case, the user using the terminal device 20 erroneously recognizes that the operation of the air conditioner is not started according to the request information, and performs an operation (specification of a position and selection of an icon) of inputting request information in the terminal device 20 again.

Therefore, the present embodiment has a configuration that notifies the user of the operation state of the air conditioner 10 (state quantity inside the air conditioner 10).

In the following description, “the operation of the air conditioner 10 is controlled” means that the control value is transmitted to the air conditioner 10 as described in the first embodiment, and the air conditioner 10 starts moving (operation) in accordance with the control value. “The air conditioner 10 actually performs the air conditioning” means that the operation of the air conditioner 10 is controlled, and after the warm-up state of supplying heat, the wind based on the set temperature or the like is actually blown out from the air conditioner 10.

FIG. 13 shows an example of the configuration of the air conditioning system according to the present embodiment. It is to be noted that the same reference numerals are attached to the same parts as those in FIG. 2, and a detailed description thereof will be omitted. Here, parts different from those in FIG. 2 will be mainly described.

The hardware configuration of the terminal device 20 and an air conditioning control device 30 in the present embodiment is the same as that of the first embodiment described above, so that the detailed description thereof will be omitted here.

In the present embodiment, the air conditioner 10 includes a transmission module 11 that transmits information (hereinafter referred to as air conditioner information) indicating the operation state of the air conditioner 10 to the terminal device 20. In the present embodiment, the operation state of the air conditioner indicated by the air conditioner information includes the air conditioner ID for identifying the air conditioner 10, the control value such as the start/stop state of the air conditioner 10, and the progress state of the control based on the control value. Note that the progress state of the control means the remaining time (period) until the above-described heat generation and transmission (that is, supply of heat) is started and air conditioning is actually performed.

Further, in the present embodiment, the transmission module 11 included in the air conditioner 10 is configured to be capable of outputting (transmitting), for example, the air conditioner information indicating the operation state of the air conditioner 10 in real time. The air conditioner information may be directly transmitted from the air conditioner 10 (the transmission module 11) to the terminal device 20, or may be transmitted to the terminal device 20 via the air conditioning control device 30, for example.

Next, an example of the processing procedure of the air conditioning system according to the present embodiment will be described with reference to the sequence chart of FIG. 14.

First, the process of steps S21 to S27 corresponding to the process of steps S1 to S7 shown in FIG. 5 is performed.

Here, in step S27, when the operation of the air conditioner 10 according to the control value transmitted in step S26 is started, the transmission module 11 included in the air conditioner 10 transmits the air conditioner information indicating the operation state of the air conditioner to the terminal device 20 (step S28).

Next, a display processing module 21 included in the terminal device 20 displays the air conditioner information transmitted in step S28 on the terminal device 20 (step S29).

Figure 14:
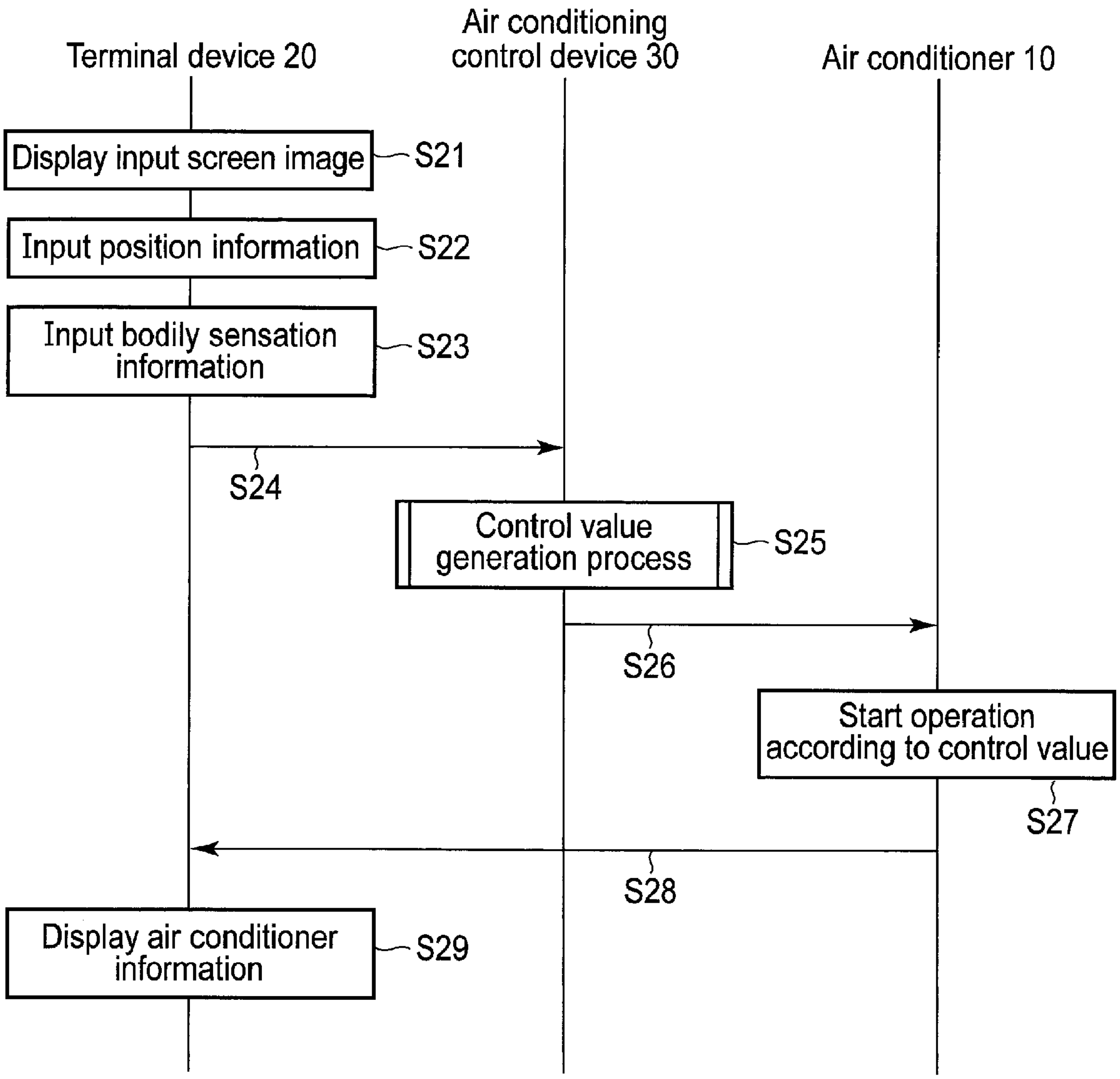
FIG. 14 is a sequence chart showing an example of a processing procedure of the air conditioning system.

According to the above-described process shown in FIG. 14, based on the air conditioner information displayed on the terminal device 20, the user can verify (grasp) that the operation state of the air conditioner 10 has changed in accordance with the control value generated based on the request information (position information and bodily sensation information) input in the terminal device 20.

In the process shown in FIG. 14, the air conditioner information is transmitted from the air conditioner 10 only in step S28, but the air conditioner information is transmitted each time the operation state of the air conditioner 10 changes. In other words, the terminal device 20 constantly keeps track of the operation state of the air conditioner 10.

The transition of the screen image displayed on the terminal device 20 in the case where the processing shown in FIG. 14 is performed will be described below.

First, when the air conditioning application is activated on the terminal device 20 based on the operation of the user, a first input screen image shown in FIG. 15 is displayed on the terminal device 20. A first input screen image 501 shown in FIG. 15 includes a floor map of an indoor space 100 in which the air conditioner 10 is installed, as described in the first embodiment.

Further, in the present embodiment, on the floor map included in the first input screen image 501, icons representing the operation state of the air conditioner 10 are arranged at the positions (coordinates) where the air conditioners 10 are installed in the indoor space 100.

Here, in the example shown in FIG. 15, icons 501*a* and 501*b* representing the operation state of the two air conditioners 10 are arranged on the floor map included in the input screen image 501.

When the air conditioner 10 whose operation state is indicated by the icon 501*a* is a first air conditioner 10, the icon 501*a* indicates that the start/stop state of the first air conditioner 10 is Off (that is, the power is turned off).

Also, when the air conditioner 10 whose operation state is indicated by the icon 501*b* is a second air conditioner 10, the icon 501*b* indicates that the start/stop state of the second air conditioner 10 is Off (that is, the power supply is turned off).

Here, the user can designate (for example, touch) the position of the user in the indoor space 100 on the floor map included in the first input screen image 501. When the position is designated by the user, the first input screen image 501 displayed on the terminal device 20 changes to a second input screen image 502 shown in FIG. 16.

In the second input screen image 502 shown in FIG. 16, since an icon 502*a* is the same as the icon 402*a* shown in FIG. 7 described above, the detailed description thereof will be omitted here. An air conditioning state selection region 502*b* shown in FIG. 16 is also the same as the air conditioning state selection region 402*b* shown in FIG. 7 described above. Furthermore, icons 502*c* to 502*g* shown in FIG. 16 are also the same as the icons 402*c* to 402*g* shown in FIG. 7 described above.

When the second input screen image 502 is displayed on the terminal device 20, the user can select (touch) one of the plurality of icons 502*c* to 502*g* in the air conditioning state selection region 502*b*. When one icon is selected by the user, the position (position information) designated by the above-mentioned user and the air conditioning state (bodily sensation information) represented by the icon selected by the user are linked, and one piece of request information is determined (generated).

Next, the second input screen image 502 displayed on the terminal device 20 changes to the screen image shown in FIG. 17. FIG. 17 shows an example of a screen image (hereinafter referred to as a first request verification screen image) displayed when the user selects the icon 502*c* in the air conditioning state selection region 502*b* provided on the second input screen image 502 shown in FIG. 16.

On a first request verification screen image 503 shown in FIG. 17, an icon 503*a* same as the icon 502*c* selected in the input screen image 502 (the air conditioning state selection region 502*b*) is displayed at the position designated by the user on the input screen image 501.

On the first request verification screen image 503, for example, the user can verify that the request information from the user has been input in the terminal device 20.

When the position of the user is designated on the first input screen image as described above, position information indicating the position is input by the position information input module 22, and when the icon representing the air conditioning state felt by the user is selected on the second input screen image, bodily sensation information indicating the air conditioning state is input by the bodily sensation information input module 23. The position information and bodily sensation information input in this manner are transmitted from the terminal device 20 to the air conditioning control device 30 as the above request information.

When the request information is transmitted from the terminal device 20 to the air conditioning control device 30, the process shown in FIG. 10 described above is performed, and the operation of the air conditioner 10 is controlled based on the control value generated by the process.

When the operation of the air conditioner 10 is started in accordance with the control value as described above, the air conditioner information indicating the operation state of the air conditioner 10 is transmitted from the air conditioner 10 to the terminal device 20, and the air conditioner information is displayed on the terminal device 20.

Here, FIG. 18 shows an example of the air conditioner information transmitted from the air conditioner 10 to the terminal device 20.

As shown in FIG. 18, the air conditioner information includes the start/stop state, the operation mode, the set temperature, the wind volume, the wind direction and the progress (situation) in association with the air conditioner ID.

The start/stop state indicates the current start/stop state of the air conditioner 10 identified by the associated air conditioner ID (that is, whether the power supply is turned on or the power supply is turned off).

The operation mode indicates the operation mode (cooling mode or heating mode) of the air conditioner 10 when the air conditioner 10 identified by the associated air conditioner ID is turned on.

The set temperature, the wind volume, and the wind direction indicate the set temperature, the wind volume, and the wind direction of the air conditioner 10 when the air conditioner 10 identified by the associated air conditioner ID is turned on.

The progress indicates the remaining time until when the operation of the air conditioner 10 identified by the associated air conditioner ID is started (for example, the power is turned on), as described above, generation and transmission of heat is started, and air conditioning by the air conditioner 10 is actually performed.

Although not described in detail, FIG. 18 indicates the air conditioner information transmitted from the first air conditioner 10 to the terminal device 20 when, for example, the control value shown in FIG. 12 described above is transmitted to the first air conditioner 10 (the air conditioner 10 identified by the air conditioner ID "1"), and the operation of the first air conditioner 10 according to the control value is started.

When the above air conditioner information shown in FIG. 18 is transmitted from the first air conditioner 10 to the terminal device 20, the first request verification screen image shown in FIG. 17 displayed on the terminal device 20 changes to the screen image shown in FIG. 19 (Hereinafter referred to as a second request verification screen image).

As shown in FIG. 19, on a second request verification screen image 504, the icon 501*a* (the icon representing that the start/stop state of the first air conditioner 10 is Off) displayed on the first request verification screen image 503 shown in FIG. 17 is changed to an icon 504*a*.

The icon 504*a* indicates that the start/stop state of the first air conditioner 10 is On (that is, the power is on).

According to the second request verification screen image 504 as described above, even when it takes time for the air conditioner 10 to perform actually air conditioning after the request information is input in the terminal device 20, the user can understood that the operation state of the first air conditioner 10 is changing (that is, the power of the first air conditioner 10 is turned on) by seeing the change in the icon representing the operation state of the first air conditioner 10.

On the second request verification screen image 504 shown in FIG. 19, only the start/stop state included in the air conditioner information shown in FIG. 18 is represented by the icon 504*a*. However, on the second request verification screen image 504, an icon 504*b* representing the wind volume and wind direction included in the air conditioner information may be further displayed as indicated by FIG. 20.

In this case, the wind volume included in the air conditioner information may be indicated by changing the length of the icon 504*b*. Further, the color of the icon 504*b* may be changed according to the temperature (blowing temperature) of the wind blowing from the first air conditioner 10. Specifically, for example, when the temperature of the wind blowing from the first air conditioner 10 is equal to or higher than a threshold value, the icon 504*b* is displayed in red, and when the temperature is equal to or lower than the threshold value, the icon 504*b* is displayed in blue.

According to this, the user can intuitively grasp the wind volume and the wind direction of the first air conditioner 10.

Although not shown in the drawing, the second request verification screen image 504 may further display the operation mode, the set temperature and the progress included in the air conditioner information.

The operation mode, the set temperature and the progress can be displayed as a pop-up when, for example, an operation of designating (touch) the icon 504*a* is performed on the second request verification screen image 504. Further, the progress may be displayed in text like "in 5 minutes", or may be displayed in a manner like a progress bar capable of intuitively grasping the state of the progress.

In FIG. 18, the air conditioner information transmitted from the air conditioner 10 includes the start/stop state, the operation mode, the set temperature, the wind volume, the wind direction, and the progress. The air conditioner information may include the information displayed on the second request verification screen image described above. In other words, the air conditioner information may not include at least one of the start/stop state, the operation mode, the set temperature, the wind volume, the wind direction and the progress, or may include information indicating the operation state of the air conditioner 10 other than these items.

As described above, in the present embodiment, after the operation of the air conditioner 10 is controlled by the air conditioning control device 30, air conditioner information indicating the operation state of the air conditioner 10 is received, and the received air conditioner information is displayed on the terminal device 20. According to the configuration, the user can grasp that the operation state of the air conditioner 10 located in the vicinity of the user has changed in accordance with the request information from the user.

Further, in the present embodiment, for example, as described above with reference to FIG. 20, the wind volume and wind direction of the air conditioner 10 included in the air conditioner information are displayed, so that the user can grasp that the air conditioner 10 is driven (operated) for the user.

Furthermore, in the present embodiment, the progress included in the air conditioner information (the remaining time from the start of control of the operation of the air conditioner 10 by the air conditioning control device 30 until the air conditioning is actually performed in the air conditioner 10) is displayed on the terminal device 20, so that the user can grasp, for example, the time required for the generation and transmission of heat in the air conditioner 10 (that is, the transient state from the change of the operation state of the air conditioner 10 to the actual start of air conditioning). According to this, it is possible to avoid such a situation in which the user erroneously recognizes that the operation of the air conditioner has not started, and operates again the terminal device 20 in order to input the request information.

Third Embodiment

Next, a third embodiment will be described. In the first embodiment described above, description is made in which an operation of an air conditioner 10 is controlled based on the request information (position information and bodily sensation information) input in a terminal device 20. Request information for the air conditioner 10 from different users using the air conditioning system in an indoor space 100 is useful for grasping the position (place) that the user feels comfortable in the indoor space 100, for example, when the user enters the indoor space 100.

Therefore, in the present embodiment, the terminal device 20 used by the user has a configuration that displays request information from different users.

In the present embodiment, the request information (for the air conditioner 10) from different users is request information including position information indicating the positions of the different users and bodily sensation information indicating the air conditioning state felt by the different users.

FIG. 21 shows an example of the configuration of the air conditioning system according to the present embodiment. It is to be noted that the same reference numerals are attached to the same parts as those in FIG. 2, and a detailed description thereof will be omitted. Here, parts different from those in FIG. 2 will be mainly described.

The hardware configuration of the terminal device 20 and an air conditioning control device 30 in the present embodiment is the same as that of the first embodiment described above, so that the detailed description thereof will be omitted here.

In the present embodiment, the air conditioning control device 30 includes a storage 32 and an acquisition module 33 in addition to a control value generation module 31 shown in FIG. 2. The storage module 32 is implemented by a storage device such as a nonvolatile memory 302 shown in FIG. 4 described above. Further, part or the entire of the acquisition module 33 is implemented by causing a CPU 301 shown in FIG. 4 to execute the air conditioning control program, that is, by software. Part or the entire of the acquisition module 33 may be implemented by hardware such as an IC, or may be implemented by a combination of software and hardware.

The storage 32 stores request information (the position information and the bodily sensation information output by an output module 24) transmitted from the terminal device 20. The storage 32 stores, for example, plural pieces of request information (that is, a log of request information) transmitted from the terminal device 20 used by each of a plurality of persons in the indoor space using the air conditioning system in the indoor space 100.

The acquisition module 33 acquires from the storage 32 the request information to display a distribution of current bodily sensation information (air conditioning states felt by different users) in the indoor space 100.

The request information acquired by the acquisition module 33 is transmitted to the terminal device 20 and displayed on the terminal device 20 as the distribution of the air conditioning states felt by different users in the indoor space 100.

In the first embodiment described above, it is assumed that, for example, when the user in the indoor space 100 feels "hot" or "cold", the air conditioning application is activated in the terminal device 20 used by the user and the request information is input.

In this case, since the storage 32 included in the air conditioning control device 30 does not store (request information including) bodily sensation information representing an air conditioning state that the user feels comfortable, so that the information including only the request information input in the terminal device 20 in the first embodiment described above cannot be said to be useful, for example, when the user enters the indoor space 100 as described above.

Therefore, in the present embodiment, after the operation of the air conditioner 10 is controlled based on the request information input in the terminal device 20, the process of determining whether an air conditioning state is felt as "comfortable" to a person in the indoor space using the terminal device 20 is performed (for example, whether air conditioning is effective or whether air conditioning is too effective).

An example of the processing procedure of the air conditioning system when controlling the operation of the air conditioner 10 based on the request information input in the terminal device 20 will be described below with reference to the sequence chart of FIG. 22. In FIG. 22, the terminal device 20 represents one terminal device 20 used by the user in the indoor space 100, and the processing shown in FIG. 22 is performed for each terminal device 20 in which position information and bodily sensation information is input.

First, the process of steps S31 to S34 corresponding to the process of steps S1 to S4 shown in FIG. 5 described above is performed. In the process of step S34, the request information is transmitted together with identification information (hereinafter referred to as personal ID) for identifying a person in the indoor space using the terminal device 20.

When the process of step S4 is performed, the air conditioning control device 30 receives the personal ID and the request information transmitted in step S4. The request information received by the air conditioning control device 30 is stored in the storage 32 included in the air conditioning control device 30 in association with the personal ID (step S35).

Next, the process of steps S36 to S38 corresponding to the processing shown in steps S5 to S7 shown in FIG. 5 is performed.

Here, in the present embodiment, when a predetermined time has elapsed after the process of step S38 has been performed, a display processing module 21 included in the terminal device 20 displays, for example, a message (hereinafter referred to as a verification message) for checking the air conditioning state felt by the person in the indoor space (step S39).

FIG. 23 shows an example of a screen image of the terminal device 20 (hereinafter referred to as an air conditioning state verification screen image) when a verification message is displayed.

As shown in FIG. 23, on an air conditioning state verification screen image 601, an icon 601*a* is placed at the position indicated by the position information input at the above-described step S32 (that is, the position of the user), and a region (hereinafter referred to as a message display area) 601*b* in which a verification message is displayed in association with the icon 601*a*.

In the example shown in FIG. 23, for example, a verification message "Are you comfortable?" is displayed in the message display area 601*b*.

Further, "Yes" and "No" are displayed in the message display area 601*b*, and the user can select (touch) "Yes" or "No" according to the air conditioning state felt by the user.

Returning to FIG. 22 again, a bodily sensation information input module 23 included in the terminal device 20 inputs bodily sensation information indicating the air conditioning state felt by the user based on the operation of the user, on the message display area 601*b* (step S40).

Specifically, when "Yes" is selected in the above message display area 601*b*, the bodily sensation information input module 23 inputs bodily sensation information indicating an air conditioning state which is felt as "comfortable".

On the other hand, when "No" is selected in the message display area 601*b*, the bodily sensation information input module 23 inputs, for example, the bodily sensation information same as the bodily sensation information input in step S33. When "No" is selected in the message display area 601*b*, the air conditioning state selection region described in the first embodiment is displayed on the air conditioning state verification screen image 601, and bodily sensation information indicating the air conditioning state represented by the icon selected in the air conditioning state selection region may be input.

Next, the output module 24 transmits, together with the personal ID, the request information including the position information input in step S32 and the bodily sensation information input in step S40 to the air conditioning control device 30 (step S41).

When the process of step S41 is performed, the air conditioning control device 30 receives the personal ID and request information transmitted in step S41. The request information received by the air conditioning control device 30 is stored in the storage 32 in association with the personal ID (step S42).

Here, FIG. 24 shows an example of the data structure of the request information stored in the storage 32. In the first embodiment described above, the request information includes the position information and the bodily sensation information. However, in the present embodiment, as shown in FIG. 24, the request information is stored in the storage 32 in association with the reception date and time and the personal ID.

The reception date and time indicates, for example, the date and time when the request information transmitted from the terminal device 20 is received by the air conditioning control device 30.

The personal ID is an identifier for identifying the user who uses the terminal device 20 that transmits the associated request information.

In the example shown in FIG. 24, the storage 32 stores request information 32*a* including the position information "20, 3" and the bodily sensation information "+2" in association with the reception date and time "7/25 8:00" and the personal ID "A". According to this, it is indicated that the request information 32*a* was received from the terminal device 20 used by the user identified by the personal ID "A" at 8:00 on July 25th.

Further, the storage 32 stores the request information 32*b* including the position information "20, 3" and the bodily sensation information "0" in association with the reception date and time "7/25 8:15" and the personal ID "A". According to this, it is indicated that the request information 32*b* was received from the terminal device 20 used by the user identified by the personal ID "A" at 8:15 on July 25th.

It should be noted that the request information 32*a* and 32*b* is received from the terminal device 20 used by the user identified by the personal ID "A", and the position information included in the request information 32*a* and 32*b* represent the same position. That is, the request information 32*a* is the request information transmitted from the terminal device 20 in the above-described step S34 shown in FIG. 22, and the request information 32*b* is the request information transmitted from the terminal device 20 in S41 shown in FIG. 22 (that is, request information including bodily sensation information input as a response to the verification message after the operation of the air conditioner 10 is controlled based on the request information 32*a*).

Although only the request information 32*a* and 32*b* stored in the storage 32 has been described here, a plural pieces of request information including the request information 32*a* and 32*b* are stored in the storage 32 as shown in FIG. 24.

Although omitted in FIG. 22, for example, when "No" is selected as a response to the verification message displayed in the message display area 601*b* of the air conditioning state verification screen image 601 shown in FIG. 23 (that is, when the bodily sensation information other than the bodily sensation information indicating the air conditioning state felt as "comfortable" in step S40 is input), the operation of the air conditioner 10 may be further controlled by repetition of the process after step S34.

Next, referring to the sequence chart of FIG. 25, an example of the processing procedure of the air conditioning system when displaying the request information from different users on the terminal device 20 as described above will be described. It should be noted that the process shown in FIG. 25 can be performed at any timing as long as the request information is stored in the storage 32 by the process of step S35 shown in FIG. 22 and the like.

Here, when request information from different users is displayed on the terminal device 20, the users using the terminal device 20 can activate the air conditioning application on the terminal device 20 by operating the terminal device 20, and instruct the display of the later-described bodily sensation distribution screen image (step S51).

When the process of step S51 is performed, the acquisition module 33 included in the air conditioning control device 30 acquires the request information from the storage 32 according to a predetermined condition (step S52).

Note that the predetermined condition includes, for example, "three pieces of request information that are request information associated with different personal IDs and whose reception dates and times are close to the current time". For example, assuming that the request information shown in FIG. 24 is stored in the storage 32, according to this condition, three pieces of request information of request information stored in the storage 32 in association with the reception date and time "7/25 10: 00" and the personal ID "A" (position information "20, 3" and bodily sensation information "+2") (hereinafter referred to as first request information), request information stored in the storage 32 in association with the reception date and time "7/25 10:08" and the personal ID "B" (position information "10, 5" and bodily sensation information "+2") (hereinafter referred to as second request information), and request information (position information "15, 10" and bodily sensation information "+1") stored in the storage 32 in association with the reception date and time "7/25 10:12" and the personal ID "C" (hereinafter referred to as third request information) are acquired.

It should be noted that the above-described condition is an example, and the predetermined condition may be, for example, "request information in which the reception date and time is within the most recent one hour" or "request information in which the reception time is the morning of yesterday" or the like. Here, the conditions relating mainly to the reception date and time are described. However, the predetermined condition may be a condition relating to other attributes (personal ID, position information or bodily sensation information) included in the requirement information, and other conditions (for example, room temperature or the like).

In addition, here, the process after step S52 is performed in accordance with step S51 (instruction of display of bodily sensation distribution). The process may be performed by detecting that new request information is accumulated in the storage 32.

The request information acquired in step S52 is transmitted (distributed) to the terminal device 20 (step S53).

When the process of step S53 is performed, the terminal device 20 receives the request information transmitted in step S53.

A display processing module 21 included in the terminal device 20 displays on the terminal device 20 a bodily sensation distribution screen image displaying bodily sensation information distributed at the position indicated by the position information (that is, third bodily sensation information indicating the air conditioning state felt by different users) based on the position information and the bodily sensation information included in the received request information (step S54).

Here, FIG. 26 shows an example of the bodily sensation distribution screen image displayed on the terminal device 20. As shown in FIG. 26, on a bodily sensation distribution screen image 701, icons representing an air conditioning state (an air conditioning state felt by different users) indicated by the bodily sensation information included in the request information are arranged (plotted) at the positions in the indoor space 100 indicated by the position information included in the request information.

Specifically, in the example shown in FIG. 26, icons 701*a* to 701*c* are arranged on the bodily sensation distribution screen image 701.

For example, assuming that the above-described first to third request information is acquired in step S52 shown in FIG. 25, the icon 701*a* shown in FIG. 26 is arranged at the position indicated by the position information "20, 3" included in the first request information, and also represents an air conditioning state (too hot) indicated by the bodily sensation information "+2" included in the first request information. Similarly, an icon 701*b* shown in FIG. 26 is placed at the position indicated by the position information "10, 5" included in the second request information and represents an air conditioning state (too hot) indicated by the bodily sensation information "+2" included in the second request information. Furthermore, the icon 701*c* shown in FIG. 26 is placed at the position indicated by the position information "15, 10" included in the third request information, and represents an air conditioning state (hot) indicated by the bodily sensation information "+1" included in the third request information.

By displaying such the bodily sensation distribution screen image 701 on the terminal device 20, the user can grasp the distribution of the air conditioning states felt by different users in the indoor space 100.

It should be noted that on the bodily sensation distribution screen image 701, an icon (hereinafter referred to as a user's icon) representing the user using the terminal device 20 displaying the bodily sensation distribution screen image 701 is arranged (displayed) at a position on the floor map corresponding to the position of the user. This position of the user may be designated by the user, for example, or may be automatically acquired by the GPS function or the like as described above. In this way, when the user's icon is arranged on the bodily sensation distribution screen image 701, it is possible to easily grasp the air conditioning state in the vicinity of the position of the user. The icon of the user is displayed in a manner distinguishable from the icons 701*a* to 701*c* (that is, icons of different users). Specifically, for example, the icon of the user may be large, compared with the icons 701*a* to 701*c* or the icons 701*a* to 701*c* may be displayed in a semi-transparent manner.

As described above, in the present embodiment, a verification message for checking the air conditioning state felt by the user after the operation of the air conditioner 10 is controlled by the air conditioning control device 30 is displayed, and the bodily sensation information (second bodily sensation information) indicating the air conditioning state felt by the user as a response to the displayed verification message is further input. Furthermore, request information including the input bodily sensation information (and position information) is stored in the storage 32 included in the air conditioning control device 30. In the present embodiment, the request information from different users stored (accumulated) in the storage 32 is displayed on the terminal device 20 used by the user entering the indoor space 100, for example.

In the embodiment, with such a configuration, the user who enters the indoor space 100 can check (the distribution of) the air conditioning states felt by different users in the indoor space 100, and can grasp, for example, the position (place) where the user can spend comfortably in the indoor space 100.

Such an air conditioning system according to the present embodiment is particularly beneficial in a space in which a user's place changes from time to time, such as a free address system office and conference indoor space, or a large vehicle such as a bus.

In the present embodiment, when "No" is selected as a response to the verification message displayed in the message display area 601*b* of the air conditioning state verification screen image 601 shown in FIG. 23, the operation of the air conditioner 10 is further controlled. In this case, for example, the time (that is, the timer time) during which the air conditioner 10 is continuously operated may be changed (corrected). Specifically, the correction value of the time during which the air conditioner 10 is continuously operated may be determined based on the time when the user presses for a long time the position where "No" is displayed in the above message display area 601*b*, or may be determined based on a numerical value directly input (designated) by the user.

Further, in the present embodiment, as described above, a message (verification message) for checking the air conditioning state felt by the user after the operation of the air conditioner 10 is controlled by the air conditioning control device 30 is displayed, and the bodily sensation information indicating the air conditioning state felt by the user is input as a response to the displayed verification message. However, when the bodily sensation information is not input within a predetermined period after the verification message is displayed, the operation of the air conditioner 10 may be stopped or the control value of the air conditioner 10 may be restored to a predetermined control value (control value before the process of step S38 is performed). When the bodily sensation information is not input within a predetermined period after the verification message is displayed, the air conditioner 10 may be continuously operated based on the current control value of the air conditioner 10.

Furthermore, on the bodily sensation distribution screen image 701 shown in FIG. 26, the icons representing the air conditioning states indicated by the bodily sensation information included in the request information are arranged (displayed) at positions indicated by position information included in request information from different users. However, the display manner of the request information on the bodily sensation distribution screen image may be different.

Specifically, the request information may be displayed so as to indicate a discrete distribution of the bodily sensation information, or may be displayed so as to indicate a continuous distribution of the bodily sensation information converted from the discrete distribution of the bodily sensation information. FIG. 26 is an example of a bodily sensation distribution screen image in a case where the request information is displayed so as to indicate a discrete distribution of the bodily sensation information.

Figure 27:
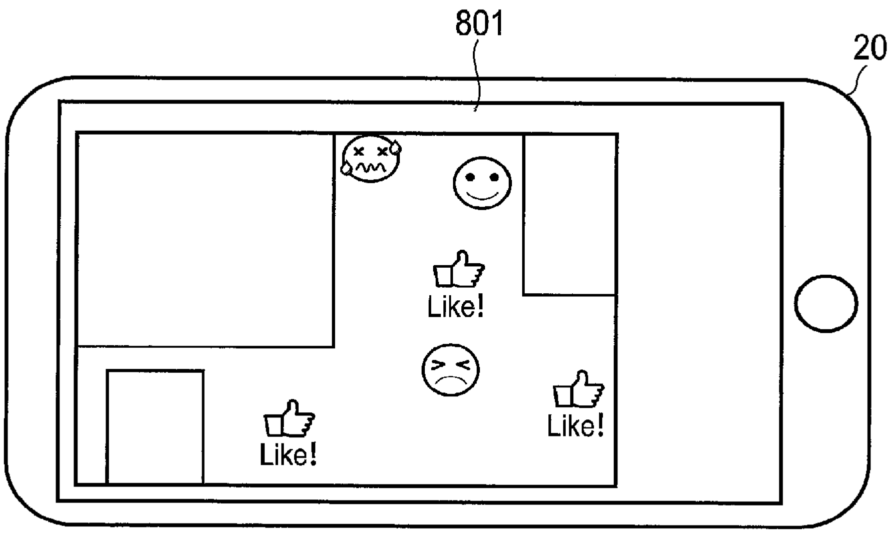
FIG. 27 is a view showing another example of a bodily sensation distribution screen image.

Here, FIG. 27 shows an example of a bodily sensation distribution screen image different from that in FIG. 26, in a case where the request information is displayed so as to indicate a discrete distribution of the bodily sensation information. As shown in FIG. 27, on a bodily sensation distribution screen image 801, icons representing the air conditioning states indicated by the bodily sensation information included in the request information are discretely displayed at the positions indicated by the position information included in each of the request information.

Figure 28:
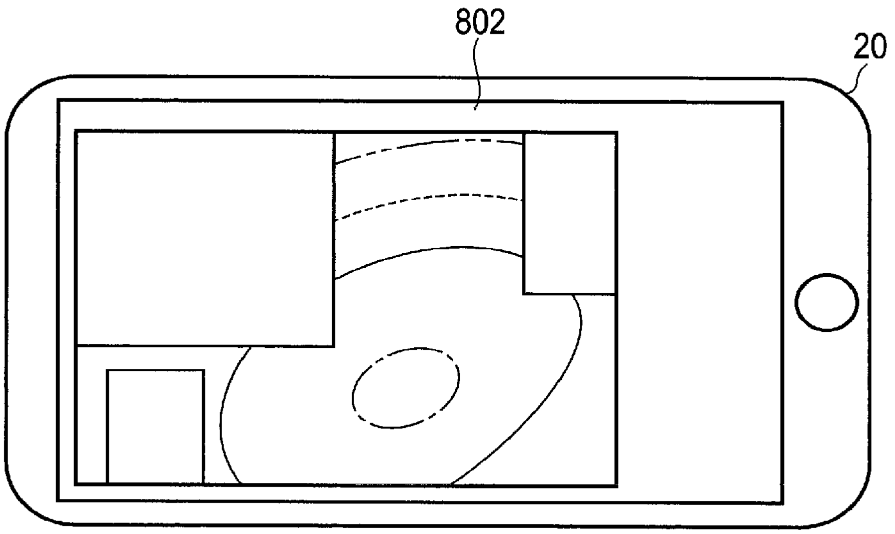
FIG. 28 is a diagram showing still another example of a bodily sensation distribution screen image.

On the other hand, FIG. 28 shows an example of a bodily sensation distribution screen image on which the request information displayed on the bodily sensation distribution screen image shown in FIG. 27 is displayed so as to indicate a continuous distribution of bodily sensation information. As shown in FIG. 28, contour lines representing a continuous distribution of bodily sensation information is displayed on the bodily sensation distribution screen image 802. The contour lines are created, for example, based on an air conditioning state (that is, a discrete distribution of bodily sensation information) indicated by the position indicated by the position information included in request information and the bodily sensation information included in the request information. The contour lines represent the heights corresponding to numerical values (that is, −2, −1, ±0, +1, and +2) expressing the air conditioning states felt by different users.

As shown in FIG. 28, when request information from different users is displayed with contour lines, since the bodily sensation information (icon) is not displayed at a specific position, it is possible to protect the privacy of different users related to the bodily sensation information.

A conversion method from the discrete distribution to the continuous distribution of the bodily sensation information may include, for example, Gaussian process regression or the like, but the conversion method is not limited to this.

In the above description, the request information (continuous distribution of bodily sensation information) from different users is displayed with contour lines, but it may be displayed by other display methods. For example, the request information from different users may be displayed in a form of a heat map in which the floor map is divided into meshes, and each mesh is expressed with a color corresponding to a representative value (numerical value expressing bodily sensation information) of a continuous distribution at a position corresponding to the mesh.

Further, text (attribute value) such as "hot" and "cold" may be written in the contour line displayed on the bodily sensation distribution screen image.

Also, contour lines corresponding to air conditioning states (+2, +1) which are felt as "too hot" and "hot" are colored and displayed with warm colors, and contour lines corresponding to the air conditioning state (−2, −1) which are felt as "too cold" and "cold" are colored and displayed with cool colors, so that it is also possible to make the user intuitively grasp the state.

As shown in FIG. 29, a bodily sensation distribution screen image 803 combining FIGS. 27 and 28 may be displayed.

As described above, in the present embodiment, it is possible to grasp that the position on the floor map in which the icon or the contour line representing the air conditioning state which is felt as "comfortable" on the bodily sensation distribution screen image is displayed is a place which is felt as "comfortable".

Therefore, in the present embodiment, it can be said that the request information from different users is useful information, for example, for improving the comfort level of the user entering the indoor space 100.

It is to be noted that in the present embodiment, the air conditioning system has, for example, the configuration shown in FIG. 21. Since the system according to the present embodiment may be configured to display request information from different users on the terminal device 20, the system may not have the configuration related to the control of the air conditioner 10 such as the air conditioner 10 and the control value generation module 31.

Furthermore, in the present embodiment, the above-described bodily sensation distribution screen image is displayed on, for example, the terminal device 20 used by the user entering the indoor space 100. The bodily sensation distribution screen image (that is, position information, first bodily sensation information and third bodily sensation information) may be displayed on the administrator terminal used by the administrator. According to such a configuration, the administrator can determine whether the comfort of the indoor space is maintained from the viewpoint of building management by referring to the bodily sensation distribution screen image displayed on the administrator terminal.

In this case, the administrator terminal may have a functional module corresponding to the display processing module 21 included in the terminal device 20 described above, and the other components (position information input module 22 and bodily sensation information input module 23) may not be provided.

Fourth Embodiment

Next, a fourth embodiment will be described. In the third embodiment described above, the user using a terminal device 20 can grasp the place where the user feels comfortable in an indoor space 100 by displaying the request information from different users on the terminal device 20. However, for example, tolerance to heat or cold (hereinafter referred to as thermal sensation tolerance) varies depending on the user (person). Therefore, even when the request information from different users is displayed on the terminal device 20 (bodily sensation distribution screen image) as described above, the air conditioning state felt by the user using the terminal device 20 is not necessarily the same as the air conditioning states felt by different users. Therefore, request information (position information and bodily sensation information) from different users displayed on the terminal device 20 may not be useful information (that is, it is not helpful) for the user using the terminal device 20.

Therefore, the present embodiment has a configuration to correct bodily sensation information included in request information from different users stored in a storage 32.

FIG. 30 shows an example of the configuration of the air conditioning system according to the present embodiment. It is to be noted that the same reference numerals are attached to the same parts as those in FIG. 21, and a detailed description thereof will be omitted. Here, parts different from those of FIG. 21 will be mainly described.

The hardware configuration of the terminal device 20 and an air conditioning control device 30 in the present embodiment is the same as that of the first embodiment described above, so that the detailed description thereof will be omitted here.

In the present embodiment, the air conditioning control device 30 includes a correction module 34 in addition to a control value generation module 31, the storage 32, and an acquisition module 33 shown in FIG. 21. It is to be noted that part or the entire of the correction module 34 is implemented by causing a CPU 301 shown in FIG. 4 to execute the air conditioning control program, that is, by software. Part or the entire of the correction module 34 may be implemented by hardware such as an IC, or may be implemented by a combination of software and hardware.

For example, the correction module 34 holds in its inside information indicating the thermal sensation tolerance of the user (hereinafter referred to as thermal sensation tolerance information) for each user who uses the air conditioning system. The thermal sensation tolerance information is information on whether the user is sensitive to heat or cold. The correction module 34 corrects the bodily sensation information included in the request information (request information from different users) acquired by the acquisition module 33 based on the thermal sensation tolerance information.

The request information including the bodily sensation information corrected by the correction module 34 is transmitted to the terminal device 20, and as in the third embodiment described above, it is displayed on the terminal device 20 as a distribution of the air conditioning states felt by different users in the indoor space 100.

Here, FIG. 31 shows an example of the data structure of the thermal sensation tolerance information held in the correction module 34 as described above. As shown in FIG. 31, the thermal sensation tolerance information includes the personal ID and the thermal sensation tolerance value in association with each other.

The personal ID is an identifier for identifying a user who uses the air conditioning system.

The thermal sensation tolerance value is a numerical value expressing the thermal sensation tolerance of the user identified by the associated personal ID. In the present embodiment, the thermal sensation tolerance includes "sensitive to heat", "normal" and "sensitive to cold", and the "sensitive to heat" is expressed as "+1", the "normal" is expressed as "0", and "sensitive to cold" is expressed as "−1".

The thermal sensation tolerance information 34*a* to 34*c* is shown in the example shown in FIG. 31. The thermal sensation tolerance information 34*a* includes an personal ID "A" and a thermal sensation tolerance value "+1". The thermal sensation tolerance information 34*a* indicates that the user identified by the personal ID "A" is "sensitive to heat".

Further, the thermal sensation tolerance information 34*b* includes a personal ID "B" and a thermal sensation tolerance value "−1". The thermal sensation tolerance information 34*b* indicates that the user identified by the personal ID "B" is "sensitive to cold".

Further, the thermal sensation tolerance information 34*c* includes a personal ID "C" and a thermal sensation tolerance value "0". The thermal sensation tolerance information 34*c* indicates that the user identified by the personal ID "C" is "normal".

Here, although only the thermal sensation tolerance information 34*a* to 34*c* indicating the thermal sensation tolerance of the user identified by each of the personal IDs "A" to "C" has been described, the thermal sensation tolerance information indicating the thermal sensation tolerance of other users is also held in the correction module 34.

The thermal sensation tolerance value included in the thermal sensation tolerance information is to be registered (designated) when the user identified by the personal ID included in the thermal sensation tolerance information starts using the air conditioning system.

Alternatively, the thermal sensation tolerance value included in the thermal sensation tolerance information may be estimated and automatically registered based on, for example, request information (request information including a personal ID included in the thermal sensation tolerance information) stored in the storage 32. Specifically, in request information including a specific personal ID, for example, when the frequency of the bodily sensation information indicating the air conditioning state which is felt as "too hot (+2)" is higher than the threshold value, user's thermal sensation tolerance value identified by the personal ID (that is, the thermal sensation tolerance value included in the thermal sensation tolerance information including the personal ID) can be set as "+1 (that is, sensitive to heat)". Similarly, in request information including a specific personal ID, for example, when the frequency of the bodily sensation information indicating the air conditioning state which is felt as "too cold (−2)" is higher than the threshold value, user's thermal sensation tolerance value identified by the personal ID (That is, the thermal sensation tolerance value included in the thermal sensation tolerance information including the personal ID) can be set as "−1 (that is, sensitive to cold)". When both the frequency of the bodily sensation information indicating the air conditioning state that is felt as "too hot" and the frequency of the bodily sensation information indicating the air conditioning state that is felt as "too cold" are lower than the threshold value, the thermal sensation tolerance value is set as "0 (that is, normal)".

Next, with reference to the sequence chart of FIG. 32, an example of a processing procedure of displaying the request information of different users on the terminal device 20 will be described.

In the present embodiment, the process shown in FIG. 22 described in the third embodiment is performed, and request information from different users is stored (accumulated) in the storage 32 included in the air conditioning control device 30.

In this case, the process of steps S61 and S62 corresponding to the process of steps S51 and S52 shown in FIG. 25 is performed. When the process of step S61 is performed in the present embodiment, the personal ID for identifying a user using the terminal device 20 is transmitted from the terminal device 20 to the air conditioning control device 30.

Next, the correction module 34 included in the air conditioning control device 30 executes a process (hereinafter referred to as a "bodily sensation information correction process") of correcting the bodily sensation information included in the request information acquired in step S62 by using the thermal sensation tolerance information held in the correction module 34 (step S63). The details of the bodily sensation information correction process will be described later.

When the bodily sensation information is corrected in step S63, the request information including the bodily sensation information is transmitted to the terminal device 20 (step S64).

When the process of step S64 is performed, the process of step S65 corresponding to the process of step 554 described above is performed.

Figure 33:
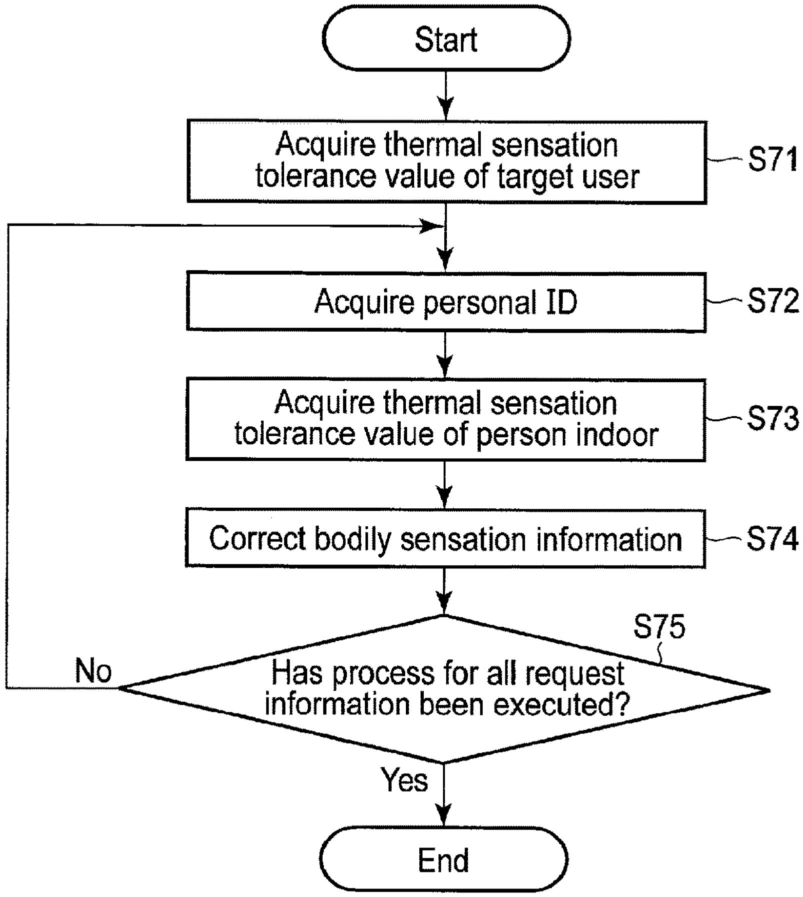
FIG. 33 is a flowchart showing an example of a processing procedure of a bodily sensation information correction process.

Next, an example of the processing procedure of the bodily sensation information correction process (the process of step S63 shown in FIG. 32) described above will be described with reference to the flowchart of FIG. 33.

Here, a user identified by the personal ID transmitted from the terminal device 20 in the step S61 shown in FIG. 32 will be described as a target user. Further, it is assumed that plural pieces of request information are acquired in step S62 shown in FIG. 32.

In this case, the correction module 34 acquires the thermal sensation tolerance value of the target user from the thermal sensation tolerance information held in the correction module 34 (step S71). In step S71, the thermal sensation tolerance information including the personal ID transmitted from the terminal device 20 in the step S61 shown in FIG. 32 is specified, and the thermal sensation tolerance value included in the thermal sensation tolerance information is acquired.

Hereinafter, the process of steps S71 to S73 is performed for each of the request information acquired in step S62 shown in FIG. 32. In the following description, the request information to be processed is referred to as target request information.

First, the correction module 34 acquires the personal ID included in the target request information (step S72). The personal ID acquired in step S72 is a personal ID for identifying a different user (hereinafter referred to as a "person in the indoor space") who is presumed to be currently in the indoor space 100.

When the process of step S72 is performed, the correction module 34 acquires the thermal sensation tolerance value of the person in the indoor space from the thermal sensation tolerance information held in the correction module 34 (step S73). In step S73, the thermal sensation tolerance information including the personal ID acquired in step S72 is specified, and the thermal sensation tolerance value included in the thermal sensation tolerance information is acquired.

Next, the correction module 34 corrects the bodily sensation information included in the target request information based on the thermal sensation tolerance value of the target user acquired in step S71 and the thermal sensation tolerance value of the person in the indoor space acquired in step S73 (step S74).

Figure 34:
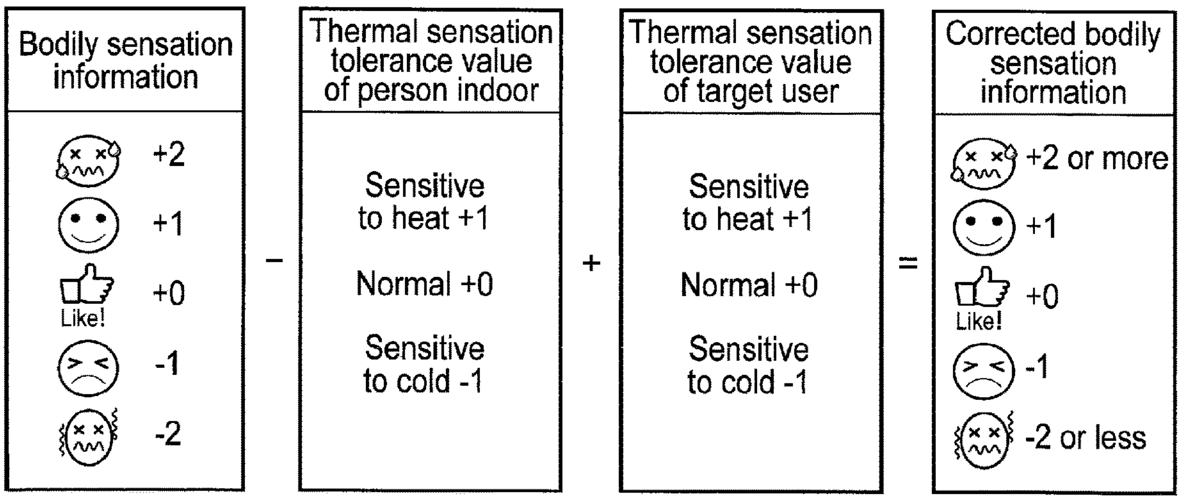
FIG. 34 is a diagram for specifically explaining a process of correcting bodily sensation information.

Here, with reference to FIG. 34, the process of correcting the bodily sensation information in step S74 will be specifically described.

As described above, the air conditioning state felt by the person in the indoor space indicated by the bodily sensation information included in the target request information includes, for example, "too hot", "hot", "normal", "cold", and "too cold". In this case, the numerical value expressing the air conditioning state that is felt as "too hot" is "+2", the numerical value expressing the air conditioning state that is felt as "hot" is "+1", the numerical value expressing the air conditioning state that is felt as "normal" is "±0", the numerical value expressing the air conditioning state that is felt as "cold" is "−1", and the numerical value expressing the air conditioning state that it feels "too cold" is "−2".

Also, the thermal sensation tolerance values of the target user and the person in the indoor space (a different user) include "+1 (sensitive to heat)", "0 (normal)", and "−1 (sensitive to cold)".

Here, when a numerical value expressing an air conditioning state felt by the person in the indoor space indicated by bodily sensation information included in the target request information is a correction target numerical value, the correction target numerical value is corrected to a numerical value calculated by "the correction target numerical value − the thermal sensation tolerance value of the person in the indoor space + the thermal sensation tolerance value of the target user" as shown in FIG. 34.

In addition, when the numerical value calculated from "the correction target numerical value − the thermal sensation tolerance value of the person in the indoor space + the thermal sensation tolerance value of the target user" is "+2" or more, the correction target numerical value is corrected to "+2". On the other hand, when the numerical value calculated from "the correction target numerical value − the thermal sensation tolerance value of the person in the indoor space + the thermal sensation tolerance value of the target user" is equal to or less than "−2", the correction target numerical value is corrected to "−2".

Hereinafter, description will be specifically made assuming that the thermal sensation tolerance information 34*a* to 34*c* shown in FIG. 31 is held inside the correction module 34.

In this case, for example, it is assumed that the request information (the position information "20, 3" and the bodily sensation information "+2") stored in the storage 32 in association with the date and time "7/25 10:00" and the personal ID "A" shown in FIG. 24 is the target request information.

In this case, the correction target numerical value described above is the bodily sensation information "+2" included in the target request information, and the thermal sensation tolerance value of the person in the indoor space (a different user identified by the personal ID "A") is "+1".

Here, when the thermal sensation tolerance value of the target user is "−1 (sensitive to cold)", the correction target numerical value (+2) is corrected to "0 (that is, comfortable)" according to the calculation of "(+2)−(+1)+(−1)".

For example, it is assumed that the request information (the position information "15, 10" and the bodily sensation information "+1") stored in the storage 32 in association with the date and time "7/25 10:12" and the personal ID "C" shown in FIG. 24 is the target request information.

In this case, the correction target numerical value described above is the bodily sensation information "+1" included in the target request information, and the thermal sensation tolerance value of the person in the indoor space (a different user identified by the personal ID "C") is "0".

Here, when the thermal sensation tolerance value of the target user is "+1 (sensitive to heat)", the correction target numerical value (+1) is corrected to "+2 (that is, too hot)" according to the calculation of "(+1)−(0) +(+1)".

Returning to FIG. 33 again, when the process of step S74 is performed, it is determined whether the processes of steps S72 to S74 have been performed for all the request information acquired in step S62 shown in FIG. 32 (step S75).

When it is determined that the process is not performed for all the request information (NO in step S75), the process returns to step S72 and the process is repeated. In this case, the process of steps S72 to S74 is performed with request information for which the process is not performed as target request information. As a result, the bodily sensation information included in all the request information is corrected.

On the other hand, when it is determined that the process has been performed for all the request information (YES in step S75), the bodily sensation information correction process ends.

In this case, the request information including the bodily sensation information corrected in the above-described step S74 is transmitted to the terminal device 20 in step S64 shown in FIG. 32.

In the present embodiment, the bodily sensation distribution screen image is displayed on the terminal device 20 in the same manner as in the above-described third embodiment. As this bodily sensation distribution screen image is already described in the third embodiment, the detailed explanation thereof will be omitted.

As described above, in the present embodiment, when request information from a different user (person in the indoor space) is displayed on the terminal device 20, the bodily sensation information (that is, an air conditioning state felt by a person in the indoor space) included in the request information is corrected based on the thermal sensation tolerance information indicating the thermal sensation tolerance of the user who uses the terminal device 20 and the person in the indoor space.

Specifically, an air conditioning state (bodily sensation information) felt by a person in the indoor space with the thermal sensation tolerance "sensitive to heat" as "comfortable" may be felt with high possibility as "cold" by a user, for example, with the thermal sensation tolerance "normal", and may be felt with high possibility as "too cold" by a user, for example, with the thermal sensation tolerance "sensitive to cold". In addition, an air conditioning state (bodily sensation information) felt by a person in the indoor space with the thermal sensation tolerance "normal" as "hot" may be felt with high possibility as "too hot" by a user, for example, with the thermal sensation tolerance "sensitive to heat", and may be felt with high possibility as "comfortable" by a user, for example, with the thermal sensation tolerance "sensitive to cold".

In the present embodiment, it is possible to display the distribution of bodily sensation information corresponding to the thermal sensation tolerance of the user using the terminal device 20 by correcting the bodily sensation information based on such a viewpoint, so that it is possible to grasp the place where the user feels "comfortable" more accurately, compared with the case of the third embodiment described above.

In addition, if a number of air conditioning states (icons) are displayed on the terminal device 20, the information may be complicated on the screen of the terminal device 20 and the place where the user feels "comfortable" can hardly be grasped.

For this reason, on the basis of thermal sensation tolerance information indicating the thermal sensation tolerance of each user, in the present embodiment, bodily sensation information indicating the air conditioning state felt by a different user having the same thermal sensation tolerance as the user using the terminal device 20, of the bodily sensation information, for example, may be displayed on the terminal device 20 (floor map). In other words, if the thermal sensation tolerance information of the user and that of a different user are identical, the bodily sensation information indicating the air conditioning state felt by the different user may be displayed on the terminal device 20.

In such a configuration, since a number of air conditioning states (icons) displayed on the terminal device 20 can be decreased by displaying the only air conditioning state (icon) presumed to be felt similarly by the user using the terminal device 20, the user's visual recognition property can be therefore improved.

According to at least one embodiment described above, a terminal device, a program, and an air conditioning system capable of obtaining useful information for improving the comfort level of the user in the indoor space in which an air conditioner is installed can be provided.

The processing performed in each of the embodiments described above can be implemented by causing a computer of each apparatus to execute a computer program. The computer program that can be executed by a computer in the present embodiment includes instructions that can cause the computer to execute the functions described in the above embodiments, and may be stored in a computer-readable storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A terminal device used by a user in an indoor space in which an air conditioner is installed, the terminal device comprising:
- a processor configured to:
  - input position information indicating a position of the user in the indoor space;
  - display a plurality of icons each representing a comfort level that the user feels and input first bodily sensation information indicating a comfort level represented by an icon selected by the user among the displayed icons; and
  - output the position information and the first bodily sensation information to an external device, wherein
- a floor map of the indoor space is displayed,
- a position indicated by the position information is designated by the user on the floor map, and
- the plurality of icons is provided in the vicinity of the position information displayed on the floor map.

2. The terminal device according to claim 1, wherein
- the external device includes a control device configured to control an operation of the air conditioner, and
- the control device is configured to control the operation of the air conditioner based on the position information and the first bodily sensation information.

3. The terminal device according to claim 2, wherein the processor is configured to:
- display a message for checking the comfort level that the user feels after the operation of the air conditioner is controlled by the control device,
- input second bodily sensation information indicating the comfort level that the user feels as a response to the displayed message, and
- when the second bodily sensation information is not inputted within a predetermined period after the message is displayed, the operation of the air conditioner is stopped or restored to a predetermined control value.

4. The terminal device according to claim 2, wherein the processor is configured to:

display a message for checking the comfort level that the user feels after the operation of the air conditioner is controlled by the control device; and input a time during which the air conditioner continues to operate as a response to the displayed message, and the control device is configured to control the operation of the air conditioner based on the time.

5. The terminal device according to claim 2, wherein the processor is configured to:

receive air conditioner information indicating an operation state of the air conditioner after the operation of the air conditioner is controlled by the control device, and display the received air conditioner information on the floor map.

6. The terminal device according to claim 2, wherein the processor is configured to:

display on the floor map a time from when an operation of the air conditioner is controlled by the control device until air conditioning is performed in the air conditioner.

7. The terminal device according to claim 1, wherein the external device comprises a different terminal device used by a different user in the indoor space, and the position information and the first bodily sensation information are displayed on the different terminal device.

8. The terminal device according to claim 1, the processor is configured to display position information indicating a position of a different user in the indoor space and third bodily sensation information indicating a comfort level that the different user feels, the position information and the third bodily sensation information being inputted into a different terminal device used by the different user in the indoor space.

9. The terminal device according to claim 8, wherein the processor is configured to display the third bodily sensation information indicating the comfort level that the different user feels when thermal sensation tolerance information of the user and that of the different user are identical.

10. The terminal device according to claim 8, wherein the third bodily sensation information indicating the comfort level that the different user feels is corrected and displayed based on tolerance information indicating thermal sensation tolerances of the user and the different user.

11. The terminal device according to claim 1, wherein the processor is configured to display on the floor map of indoor space position information indicating a position of each of a plurality of different users in the indoor space and third bodily sensation information indicating a comfort level that each of the different users feels, the position information and the third bodily sensation information being inputted into each of a plurality of different terminal devices used by the different users in the indoor space, and the third bodily sensation information inputted into each of the different terminal devices is displayed as a contour line based on the position information, on the floor map.

12. A non-transitory computer-readable storage medium having stored thereon a program which is executable by a computer of a terminal device used by a user in an indoor space in which an air conditioner is installed, the program comprising instructions capable of causing the computer to execute functions of:

inputting position information indicating a position of the user in the indoor space;

displaying a plurality of icons each representing a comfort level that the user feels and inputting bodily sensation information indicating a comfort level represented by an icon selected by the user among the displayed icons; and outputting the position information and the bodily sensation information to an external device, wherein a floor map of the indoor space is displayed, a position indicated by the position information is designated by the user on the floor map, and the plurality of icons is provided in the vicinity of the position information displayed on the floor map.

13. An air conditioning system comprising a terminal device used by a user in an indoor space in which an air conditioner is installed and an external device communicably connected to the terminal device, wherein the terminal device comprises a processor configured to:

input position information indicating a position of the user in the indoor space;

display a plurality of icons each representing a comfort level that the user feels and input bodily sensation information indicating a comfort level represented by an icon selected by the user among the displayed icons; and output the position information and the bodily sensation information to an external device, the external device is configured to perform a process for improving a comfort level of the user based on the position information and the bodily sensation information, a floor map of the indoor space is displayed on the terminal device, a position indicated by the position information is designated by the user on the floor map, and the plurality of icons is provided in the vicinity of the position information displayed on the floor map.

* * * * *